US012377668B2

(12) United States Patent
Shimizu et al.

(10) Patent No.: US 12,377,668 B2
(45) Date of Patent: Aug. 5, 2025

(54) PRINTER

(71) Applicant: SATO HOLDINGS KABUSHIKI KAISHA, Tokyo (JP)

(72) Inventors: Takayoshi Shimizu, Tokyo (JP); Kazuyuki Hoshi, Tokyo (JP)

(73) Assignee: SATO CORPORATION, Tokyo (JP)

( * ) Notice: Subject to any disclaimer, the term of this patent is extended or adjusted under 35 U.S.C. 154(b) by 147 days.

(21) Appl. No.: 18/035,687

(22) PCT Filed: Nov. 10, 2021

(86) PCT No.: PCT/JP2021/041326

§ 371 (c)(1),
(2) Date: May 5, 2023

(87) PCT Pub. No.: WO2022/107657

PCT Pub. Date: May 27, 2022

(65) Prior Publication Data

US 2023/0391109 A1 Dec. 7, 2023

(30) Foreign Application Priority Data

Nov. 18, 2020 (JP) ................................ 2020-191930

(51) Int. Cl.
*B41J 11/04* (2006.01)
*B41J 3/407* (2006.01)
(Continued)

(52) U.S. Cl.
CPC ............ *B41J 11/04* (2013.01); *B41J 15/042* (2013.01); *B41J 15/046* (2013.01); *B41J 29/13* (2013.01)

(58) Field of Classification Search
CPC ... B41J 11/04; B41J 11/02; B41J 3/407; B41J 3/4075; B41J 15/04; B41J 15/042; B41J 15/046; B41J 29/12; B41J 29/13
See application file for complete search history.

(56) References Cited

U.S. PATENT DOCUMENTS 6,118,469 A 9/2000 Hosomi
2004/0070662 A1* 4/2004 Shimoda ................ B41J 15/042 347/222

(Continued)

FOREIGN PATENT DOCUMENTS

JP 2005-262669 A 9/2005
JP 2007-176007 A 7/2007

(Continued)

*Primary Examiner* — Justin Seo
*Assistant Examiner* — Kendrick X Liu
(74) *Attorney, Agent, or Firm* — Foley & Lardner LLP

(57) ABSTRACT

An embodiment of the present invention is a printer including: a body case; a platen roller configured to feed a print medium; and a printer cover being swingable relative to the body case and having an outer printer cover and an inner printer cover that are disposed to overlap each other. The inner printer cover is detachably attached to the outer printer cover, and is swingable relative to the body case, independently of the outer printer cover, when the inner printer cover is detached from the outer printer cover. The outer printer cover includes: a first holder configured to detachably hold both ends of a platen shaft of the platen roller when the inner printer cover is detached; and a second holder configured to detachably hold the platen roller when the inner printer cover is detached.

20 Claims, 28 Drawing Sheets

(51) Int. Cl.
*B41J 15/04* (2006.01)
*B41J 29/13* (2006.01)

(56) References Cited

U.S. PATENT DOCUMENTS

| | | | | |
|---|---|---|---|---|
| 2005/0207813 | A1* | 9/2005 | Takabatake ............ | B41J 15/042<br>400/693 |
| 2016/0052304 | A1 | 2/2016 | Obara | |
| 2016/0236492 | A1 | 8/2016 | Hutnak et al. | |
| 2021/0053375 | A1* | 2/2021 | Tsuchiya ................ | B41J 15/042 |

FOREIGN PATENT DOCUMENTS

| | | | |
|---|---|---|---|
| WO | WO-2010/066160 | A1 | 6/2010 |
| WO | WO-2014/155881 | A1 | 10/2014 |

* cited by examiner

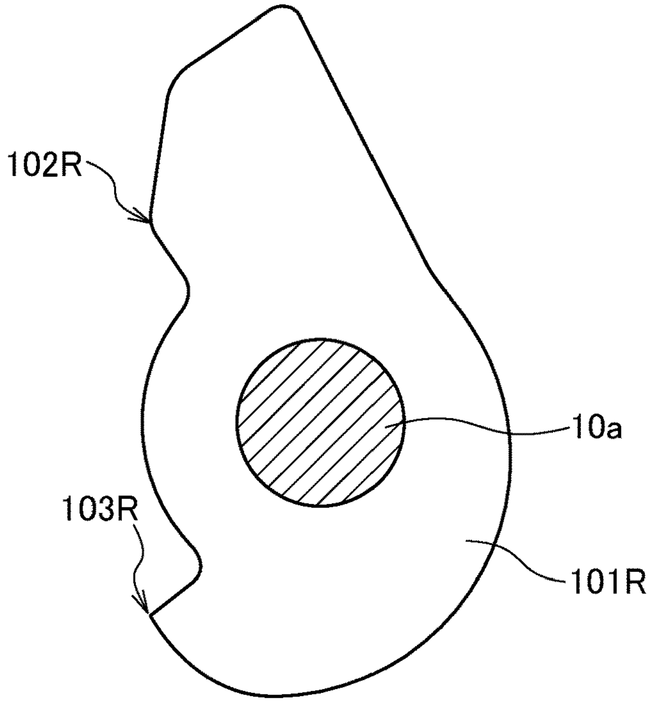
ENLARGED A-A CROSS SECTION
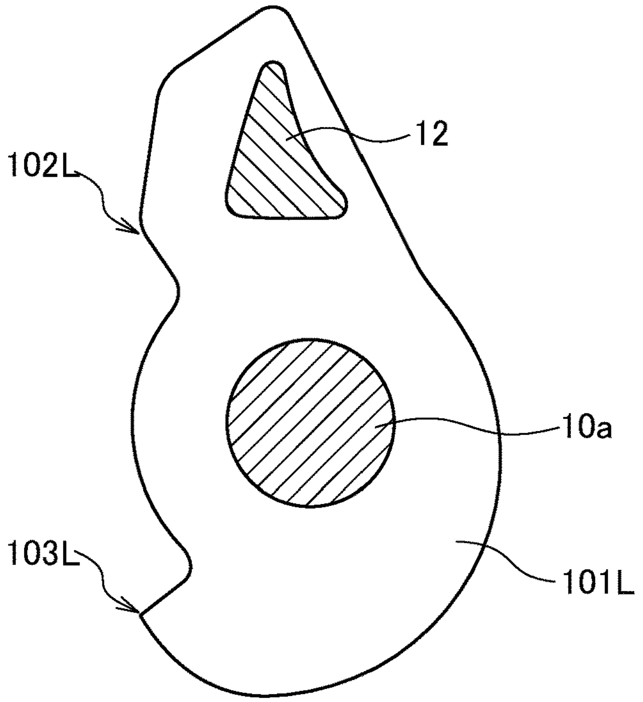
FIG.7 ENLARGED B-B CROSS SECTION

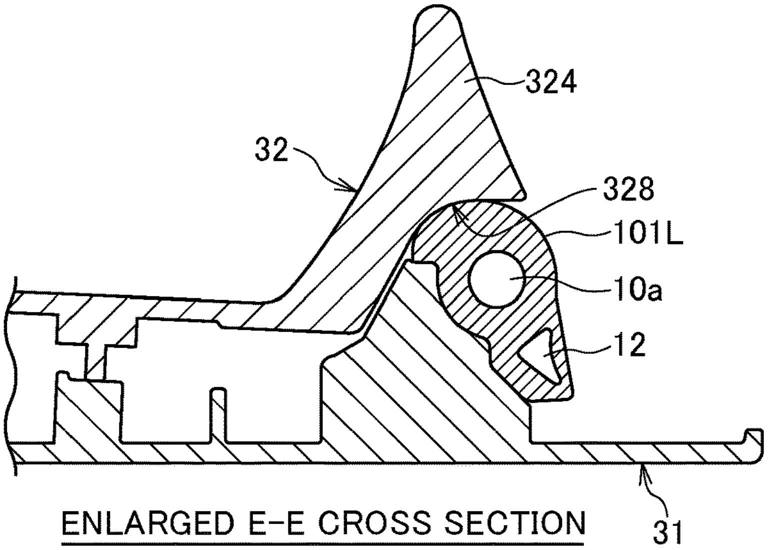
ENLARGED E-E CROSS SECTION
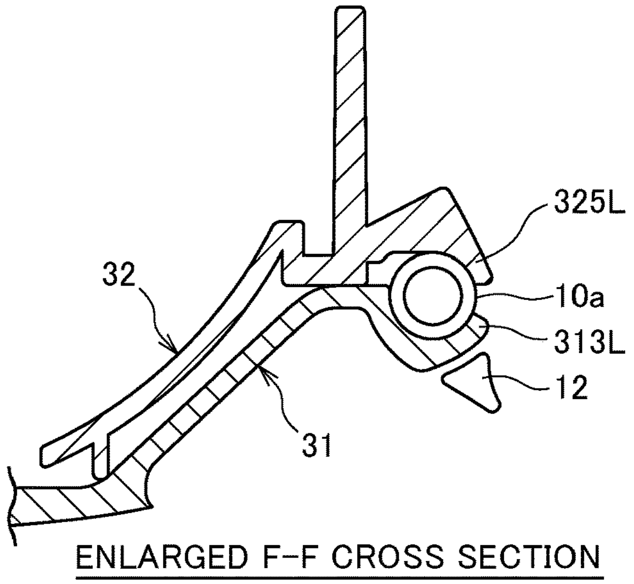
ENLARGED F-F CROSS SECTION
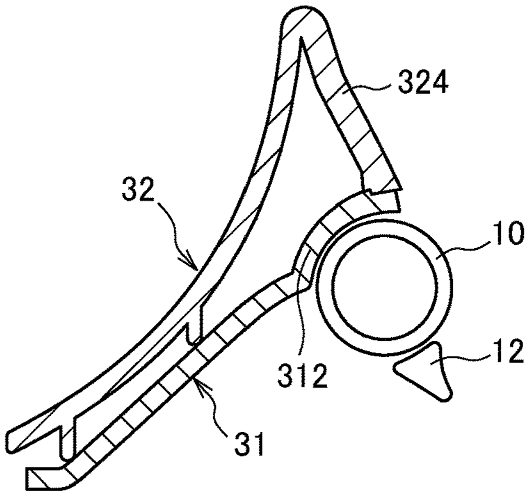
FIG.27
ENLARGED G-G CROSS SECTION

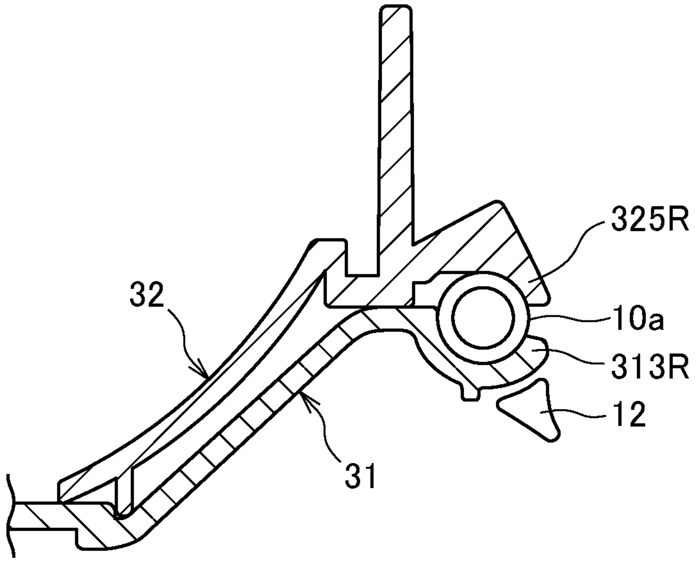
ENLARGED H-H CROSS SECTION
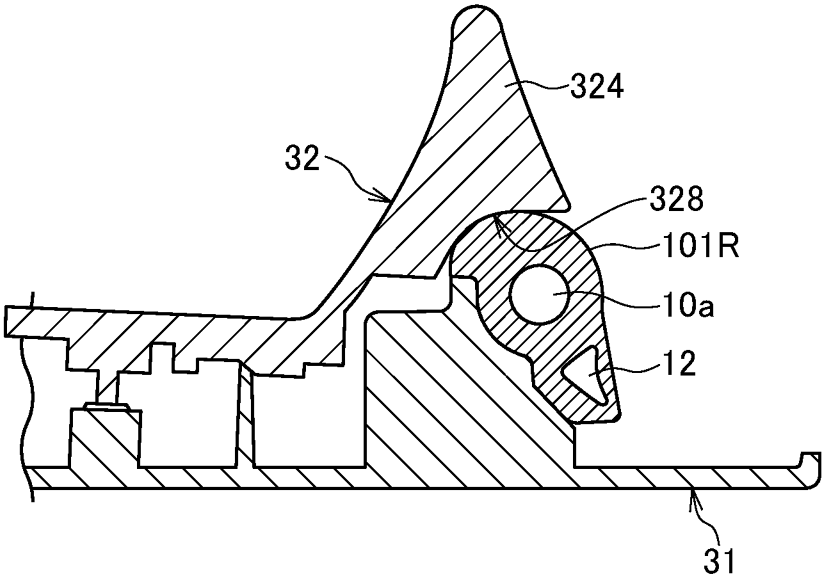
ENLARGED I-I CROSS SECTION
FIG.28

PRINTER

FIELD

The present invention relates to a printer.

BACKGROUND

Some known label printers, in particular, small label printers, have a printer cover attached with a platen roller.

For example, U.S. Pat. No. 6,118,469 discloses a thermal printer having a cover attached with a platen roller. In this printer, when the cover is closed, platen roller shaft supports abut on groove sections of a main frame to hold the platen roller.

BRIEF SUMMARY

Technical Problem

Existing printers as described above have a printer cover of a single-layer structure, which is difficult to increase strength. A printer cover having a low strength may cause a semi-closed phenomenon in which only one side is closed due to deformation of the printer cover, when closed.

On the other hand, it is also desired to facilitate replacement of a platen roller attached to a printer cover. In the printer disclosed in the Patent literature 1, the platen roller is held by closing the cover on which the platen roller is temporarily placed. This structure may cause the platen roller to come off from the cover before it is held, and workability in replacing the platen roller is not very good.

In view of this, an object of the present invention is to improve strength of a printer cover and workability in replacing a platen roller attached to a printer cover.

Solution to Problem

An embodiment of the present invention is a printer including a body case, a platen roller, and a printer cover. The platen roller is configured to feed a print medium. The printer cover is swingable relative to the body case and having an outer printer cover and an inner printer cover that are disposed to overlap each other. The inner printer cover is detachably attached to the outer printer cover. The inner printer cover is swingable relative to the body case, independently of the outer printer cover, in a state in which the inner printer cover is detached from the outer printer cover. The outer printer cover includes a first holder and a second holder. The first holder is configured to detachably hold both ends of a platen shaft of the platen roller when the inner printer cover is detached. The second holder is configured to detachably hold the platen roller when the inner printer cover is detached.

Advantageous Effects

The one aspect of the present invention enables improving strength of a printer cover and workability in replacing a platen roller attached to a printer cover.

BRIEF DESCRIPTION OF DRAWINGS

FIG. 7 shows an enlarged A-A cross section and an enlarged B-B cross section in FIG. 6B.

FIG. 27 shows an enlarged E-E cross section, an enlarged F-F cross section, and an enlarged G-G cross section in FIG. 26.

FIG. 28 shows an enlarged H-H cross section and an enlarged I-I cross section in FIG. 26.

DETAILED DESCRIPTION

Schematic Structure of Printer

A printer 1 according to one embodiment of the present invention is a label printer in which continuous issuing and peeling issuing can be switched. Hereinafter, the printer 1 will be described in detail with reference to the attached drawings.

Figure 1A:
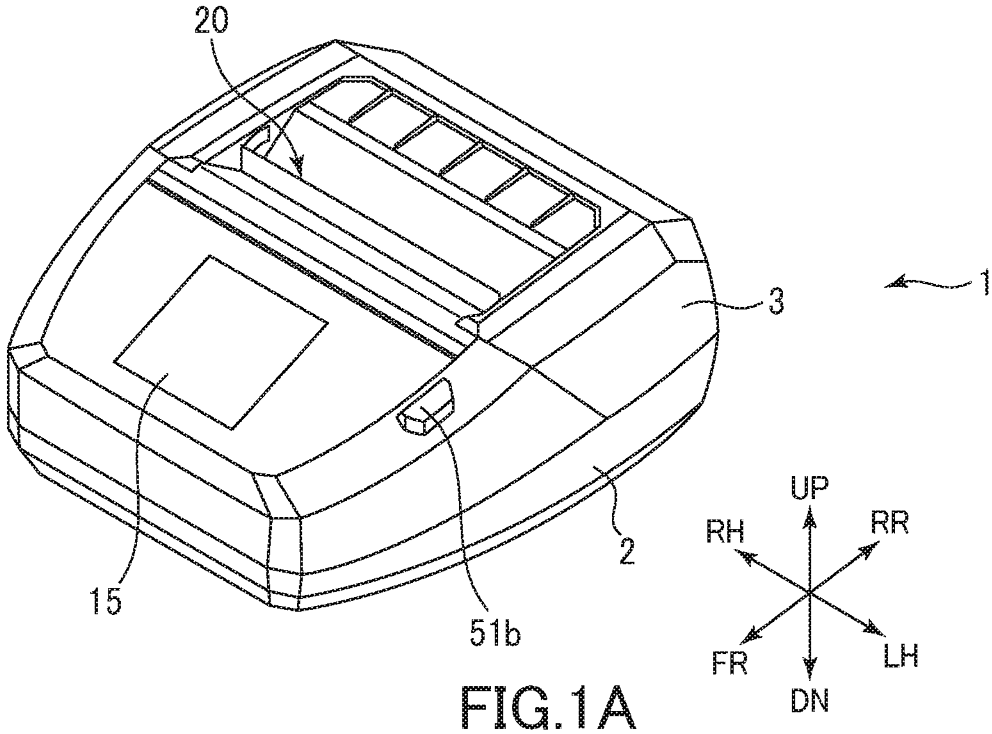
FIG. 1A is a perspective view of a printer according to an embodiment, in which a printer cover is in a closed state.
Figure 1B:
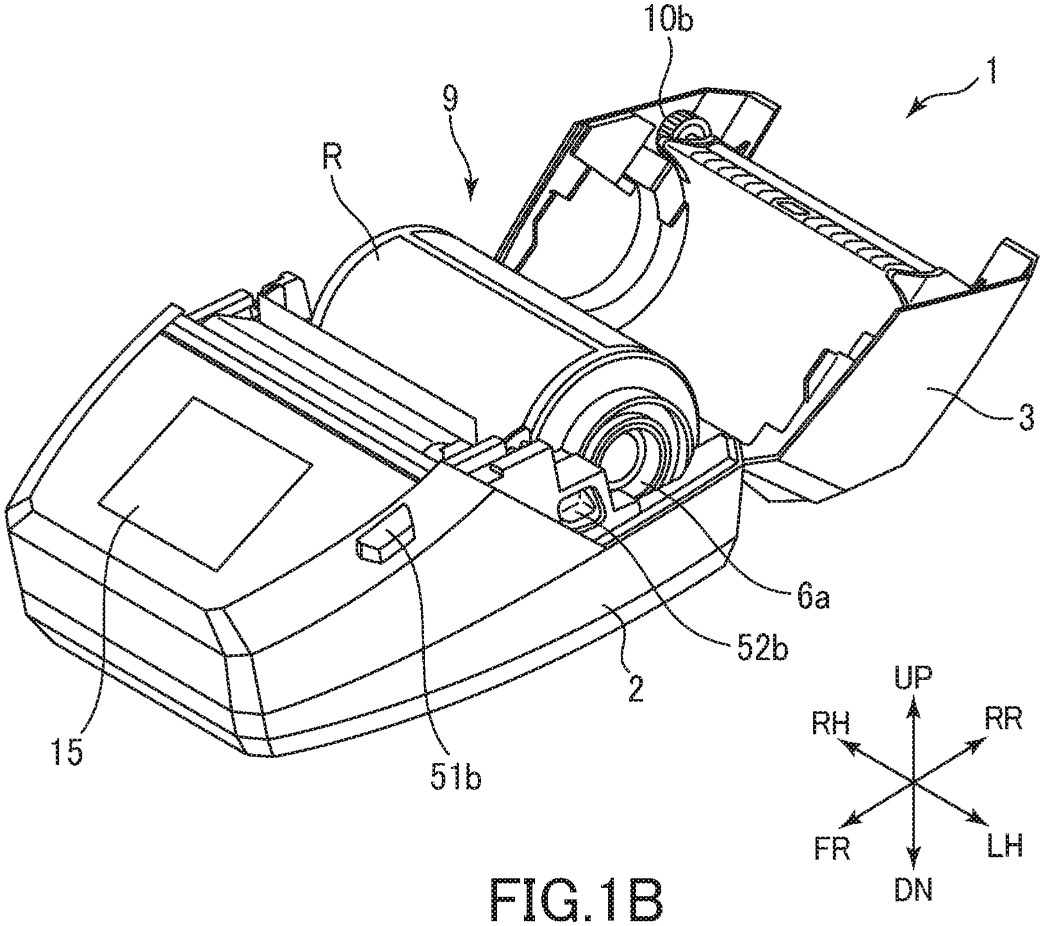
FIG. 1B is a perspective view of the printer of the embodiment, in which the printer cover is in an open state.

It is noted that directions of up (UP), down (DN), left (LH), right (RH), front (FR), and rear (RR) are defined in each drawing, for example, as illustrated in the perspective views of FIGS. 1A and 1B, but these definitions of directions are made mainly for convenience of explanation of drawings and are not intended to limit an in-use position of the printer of the present invention.

In these definitions of directions, a "printer front-rear direction" means a front-rear direction of the printer 1. A "printer width direction" means a right-left direction or a lateral direction of the printer 1.

Figure 2:
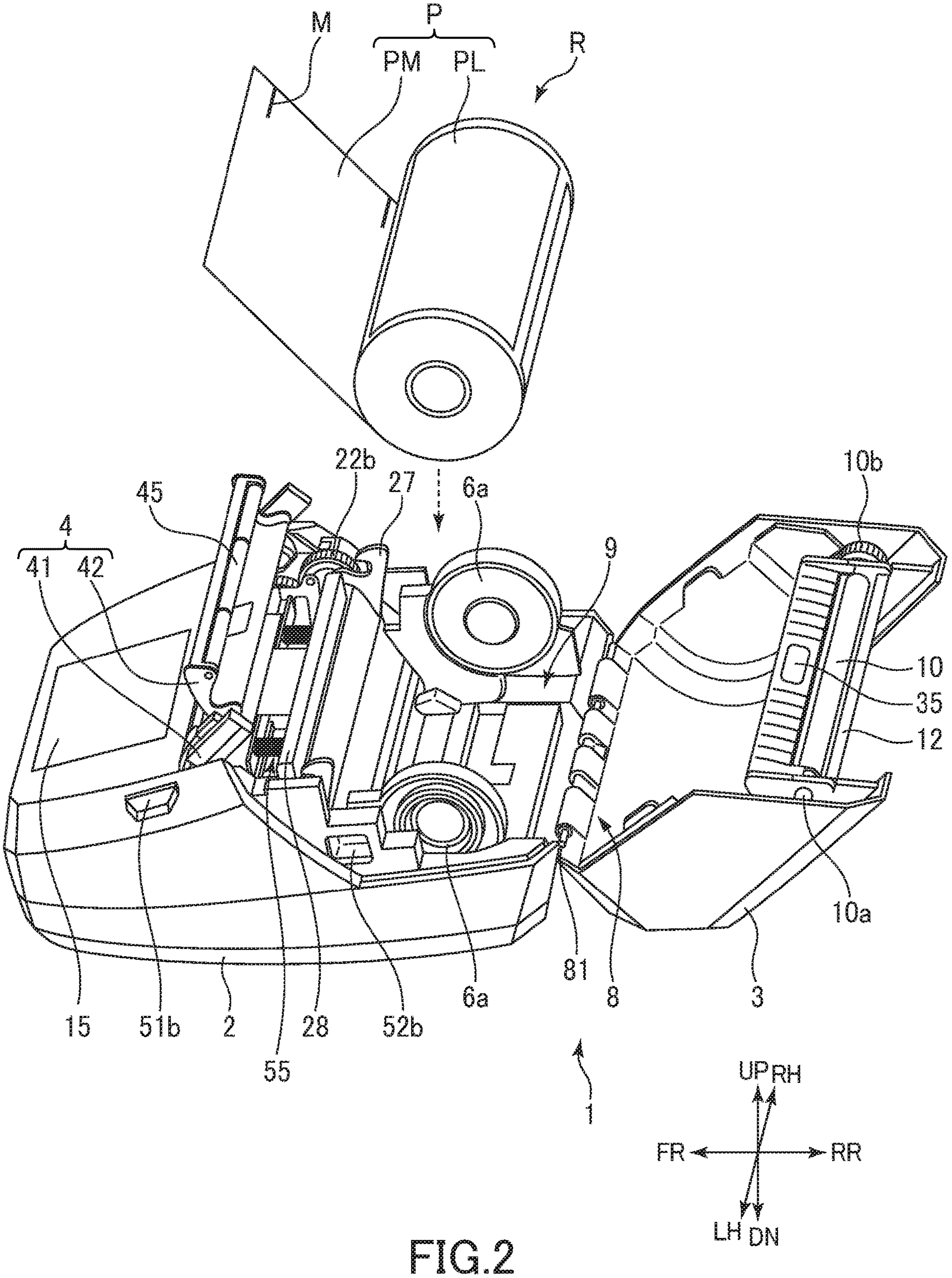
FIG. 2 is a perspective view of the printer of the embodiment, in which the printer cover is in the open state, a peeling unit is in an open state, and a paper roll is not contained.

Each of FIGS. 1A, 1B, and 2 is a perspective view of the printer 1 of the one embodiment. FIG. 1A shows a case in which a printer cover 3 is in a closed state. FIGS. 1B and 2 show cases in which the printer cover 3 is in an open state. FIG. 1B shows a state in which a paper roll "R" is set. FIG. 2 illustrates a paper roll "R" and shows a state of the printer 1 before the paper roll "R" is set.

As shown in FIG. 1A, the printer 1 has a body case 2 and the printer cover 3 that protect internal functional components. The printer 1 has an upper surface provided with an ejection part 20 for ejecting labels.

It is possible to use the printer 1 with the ejection part 20 facing upward (in a horizontally placed state); however, the printer 1 can also be used with the ejection part 20 facing a horizontal direction (in a vertically held state), such as by hanging a belt hook (not shown) provided on a bottom of the printer 1, on a belt of a user, or by attaching a shoulder strap (not shown) to the printer 1 and putting it on a shoulder of a user.

A display panel 15 is provided on a front side of the ejection part 20 in the body case 2. The display panel 15 may have a touch panel input mechanism for receiving an operation input from a user. The display panel 15 is connected to a circuit board inside the printer 1 and outputs an image of a user interface related to, for example, an operating state of the printer 1 or operation of the printer 1, based on a display signal supplied from the circuit board.

Although not shown, an internal frame for supporting or holding various functional components is disposed in the inside of the printer 1, which is surrounded by the body case 2 and the printer cover 3. The internal frame, the body case 2, and the printer cover 3 correspond to a printer body.

The printer cover 3 is swingable between an open position for exposing the inside of the printer 1 and a closed position for covering the inside of the printer 1.

In response to operation to a cover open button 51*b* that is provided to the body case 2, the printer cover 3 opens as shown in FIG. 1B. Opening the printer cover 3 exposes a paper roll-containing chamber 9. The paper roll-containing chamber 9 form space for containing a paper roll "R" (an example of a roll body).

As shown in FIG. 2, the paper roll "R" has a roll shape into which a strip continuous paper "P" is wound. The continuous paper "P" includes a strip liner PM and a plurality of labels PL that are temporarily attached on the liner PM at predetermined intervals. A label adherend surface of the liner PM is coated with a release agent, such as silicone, in order to easily peel off labels PL. In addition, position detection marks "M" that indicate reference positions of labels PL are formed at predetermined intervals on a back surface of the label adherend surface of the liner PM.

A front side of the label PL is a printing surface to be printed with information, and it is formed with a thermal color developing layer that develops a specific color when reaching a predetermined temperature region. A back side of the printing surface is an adhesive surface coated with an adhesive. The adhesive surface is attached to the label adherend surface of the liner PM, whereby the label PL is temporarily attached on the liner PM.

A pair of paper roll guides 6*a* are placed in the paper roll-containing chamber 9. The pair of paper roll guides 6*a* are members that rotatably support the paper roll "R" while being in contact with both side surfaces of the paper roll "R" and that guide feeding the continuous paper pulled out of the paper roll "R." The paper roll guides 6*a* are preferably movable along a width direction of the paper roll "R" in order to vary their positions in accordance with the width of the paper roll "R."

As shown in FIG. 2, the printer cover 3 is axially supported to the body case 2 by a hinge 8 so as to swing relative to the body case 2 between the open position and the closed position. The hinge 8 has a hinge shaft 81 that is provided with a torsion spring (described later) for biasing the printer cover 3 in a direction from the closed position to the open position.

As shown in FIG. 2, a platen roller 10 is axially supported in a manner rotatable in forward and reverse directions, at an end of the printer cover 3. The platen roller 10 is a feeding unit for feeding the continuous paper "P" pulled out of the paper roll "R" and is formed in such a manner as to extend along the width direction of the continuous paper "P." A gear 10*b* is coupled to an end of a platen shaft 10*a* of the platen roller 10. When the printer cover 3 is at the closed position, the gear 10*b* engages with a gear 22*b* that is disposed in the body case 2, and it is mechanically connected via the gear 22*b* to a roller-driving stepping motor (not shown) or the like.

As shown in FIG. 2, a peeling bar 12 (an example of a peeling member) is placed along and in the vicinity of the platen roller 10, in the printer cover 3. The peeling bar 12 is a peeling member for peeling labels PL from the liner PM and is fixed to both side walls of the printer cover 3 at both ends. The peeling bar 12 may be fixed to both ends of the platen shaft 10*a*.

In an embodiment, as described later, an integrated platen roller 11 that is a combination of the platen roller 10 and the peeling bar 12 is attached.

In an embodiment, the cross section of the peeling bar 12 has a substantially triangle shape; however, it is not limited thereto, and it may have a spherical shape or an elliptical shape.

The body case 2 is provided with a platen-holding bracket 27 for holding the platen shaft 10*a* of the platen roller 10 when the printer cover 3 is closed. A thermal head 28 is disposed in front of the platen-holding bracket 27.

The platen-holding bracket 27 is swingable around a swing shaft set to the internal frame, in accordance with operation to the cover open button 51*b*. When the printer cover 3 is at the closed position, the platen shaft 10*a*, which is attached to the printer cover 3, engages with a U-shaped groove of the platen-holding bracket 27. In response to the cover open button 51*b* being operated when the printer cover 3 is at the closed position, engagement of the platen shaft 10*a* by the platen-holding bracket 27 is released, and the printer cover 3 moves (swings) to the open position by the biasing force of the torsion spring, which is provided to the hinge shaft 81.

The thermal head 28 is a print unit for printing information such as characters, symbols, figures, or bar codes, on labels PL, which are temporarily attached on the liner PM fed out of the paper roll "R." The thermal head 28 is provided so as to face the platen roller 10 when the printer cover 3 is in the closed state.

A flexible cable that is connected to the circuit board (not shown) is detachably attached to the thermal head 28. The thermal head 28 includes a plurality of heating elements (heating resistors) that are arranged along the width direction of the continuous paper "P." The thermal head 28 performs printing by selectively energizing the plurality of heating elements based on a signal transmitted from the circuit board.

As shown in FIG. 2, coil springs 55 are disposed in front of the thermal head 28. The coil spring 55 is in contact with the thermal head 28 at a rear end and is also in contact with the internal frame at a front end. The coil spring 55 biases the thermal head 28 to the platen roller 10 in printing, whereby the thermal head 28 is pressed against the platen roller 10 by an optimum pressure for printing.

The printer 1 includes a peeling unit 4 and performs continuous issuing and peeling issuing in accordance with the peeling unit 4 moved between a continuous issuing position and a peeling issuing position. As shown in FIG. 1B, a peeling unit open button 52*b* is exposed when the printer cover 3 is at the open position. The peeling unit 4 is moved by operating the peeling unit open button 52*b*. FIG. 2 shows a state of the peeling unit 4 when the peeling unit open button 52*b* is operated.

The peeling unit open button 52*b* is operated by a user, in order to switch from continuous issuing to peeling issuing.

As shown in FIG. 2, the peeling unit 4 includes a peeling roller cover 41 and a peeling roller holder 42 that holds a peeling roller 45. The peeling roller cover 41 covers the peeling roller holder 42 in continuous issuing. The peeling roller cover 41 is axially supported by the internal frame in the body case 2 and swings from a closed position to an open position (state shown in FIG. 2) in accordance with operation to the peeling unit open button 52*b*.

The peeling roller holder 42 is axially supported by the peeling roller cover 41. In continuous issuing, the peeling roller holder 42 is contained in such a manner as to be folded under a back surface of the peeling roller cover 41.

The printer cover 3 is provided with a sensor 35. The sensor 35 is disposed in a feeding path of the continuous paper "P", along which the continuous paper "P" pulled out of the paper roll "R" reaches the platen roller 10. The sensor 35 detects positions of labels PL, when the printer cover 3 is in the closed state. It is preferable to control a feeding amount of the continuous paper "P" based on results detected by the sensor 35.

Although not shown, it is preferable to provide a cutter for cutting the liner PM of the continuous paper "P" that has been continuously issued. In the case of providing the cutter, the cutter is placed at the ejection part 20 so as to extend along the width direction of the continuous paper "P." Alternatively, the function of the cutter may be imparted to the peeling bar 12.

Continuous Issuing and Peeling Issuing

Next, continuous issuing and peeling issuing of the printer 1 will be described with reference to FIG. 3.

The printer 1 is configured to allow switching between peeling issuing and continuous issuing. Peeling issuing is issuing labels after peeling them from a liner of a continuous paper, while continuous issuing is issuing labels without peeling them from the liner.

For continuous issuing, a liner that is attached with a necessary amount of labels is prepared, and the labels can be affixed by peeling them from the liner in a working site. Thus, continuous issuing is appropriate for a situation that a target on which a label is to be affixed is distant from the printer 1. In order to perform continuous issuing, the peeling unit 4, which is mounted to the printer 1, is set to the continuous issuing position.

On the other hand, in the case of peeling issuing, labels are ejected one by one in a state of being peeled from a liner. Thus, peeling issuing is appropriate for a situation that a target on which a label is to be affixed is close to a user. In order to perform peeling issuing, the peeling unit 4, which is mounted to the printer 1, is set to the peeling issuing position. In this state, as a continuous paper is fed by rotating the platen roller 10 in order to perform printing, while a liner is fed in a state of being held between the peeling roller 45 and the platen roller 10, printed labels are individually peeled from the liner and are then ejected to the outside of the printer 1.

Figure 3:
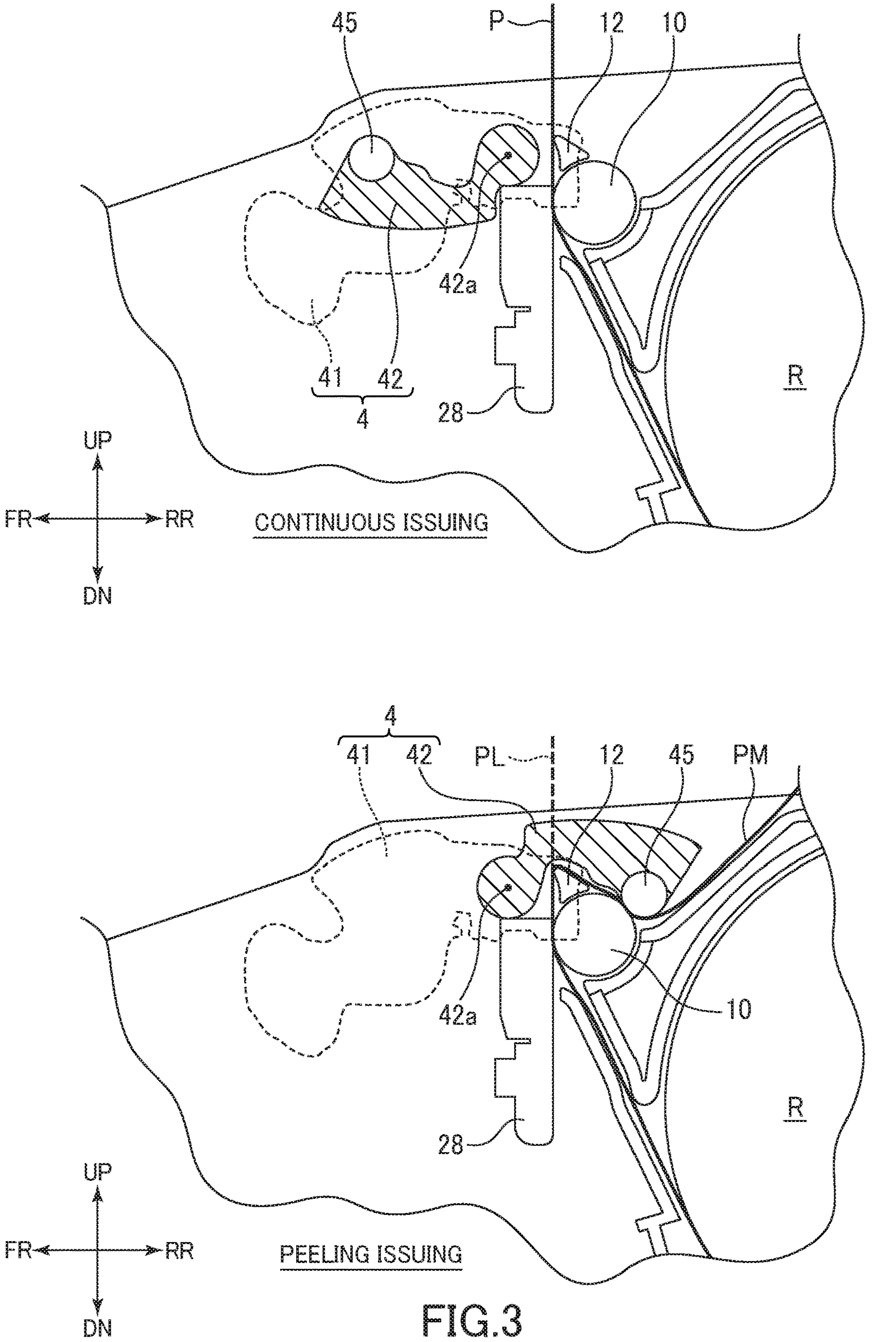
FIG. 3 shows partial sectional views for explaining continuous issuing and peeling issuing in the printer of the embodiment.

FIG. 3 shows schematic partial sectional views showing positional relationships between the peeling unit 4, the platen roller 10, the peeling bar 12, and the thermal head 28 in continuous issuing and in peeling issuing. The peeling roller cover 41 and the peeling roller holder 42 of the peeling unit 4 are represented only by outlines in FIG. 3. The outline of the peeling roller cover 41 is shown by a dotted line.

In addition, the position of the peeling roller holder 42 differs between continuous issuing and peeling issuing, and therefore, only the peeling roller holder 42 is shown by hatching.

The position of the peeling unit 4 in continuous issuing corresponds to the continuous issuing position, whereas the position of the peeling unit 4 in peeling issuing corresponds to the peeling issuing position.

As shown in FIG. 3, in continuous issuing, the peeling roller holder 42 is contained under the peeling roller cover 41, and the peeling roller 45 is thereby at a position spaced apart from the platen roller 10 and thus does not interrupt ejection of the continuous paper "P." The continuous paper "P" that has been pulled out of the paper roll "R" is nipped between the platen roller 10 and the thermal head 28, and labels on the continuous paper "P" are printed.

In order to switch from continuous issuing to peeling issuing, the peeling roller holder 42 is swung around a shaft 42*a* to a position shown in FIG. 3. As shown in FIG. 3, in peeling issuing, the peeling roller 45 is disposed at a position facing the platen roller 10. In peeling issuing, the peeling bar 12 is disposed at a position in contact with the liner PM, on a downstream side of the platen roller 10. Also, in peeling issuing, the continuous paper "P" that has been pulled out of the paper roll "R" is nipped between the platen roller 10 and the thermal head 28, and labels on the continuous paper "P" are printed. This movement is the same as in continuous issuing. In peeling issuing, the liner PM of the continuous paper "P" that has been pulled out of the paper roll "R" is quickly turned by the peeling bar 12 and is nipped between the platen roller 10 and the peeling roller 45 to be ejected. In accordance with quick turning of the liner PM at the peeling bar 12, a label PL is peeled from the liner PM and ejected.

Structure of Printer Cover

Next, a structure of the printer cover 3 will be described with reference to FIGS. 4 to 7.

Figure 4:
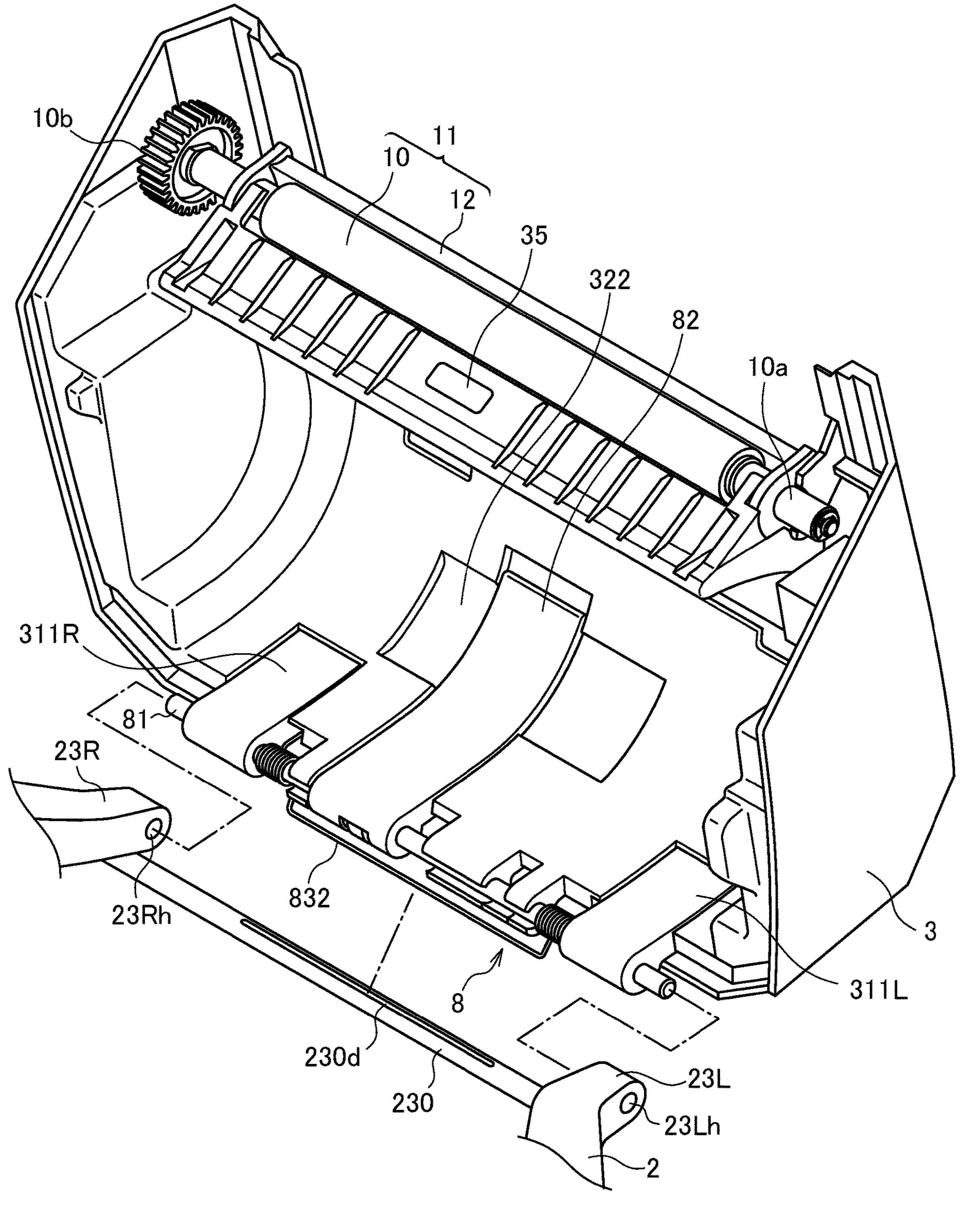
FIG. 4 shows a coupling structure between the printer cover and a body case of the printer of the embodiment.
Figure 5:
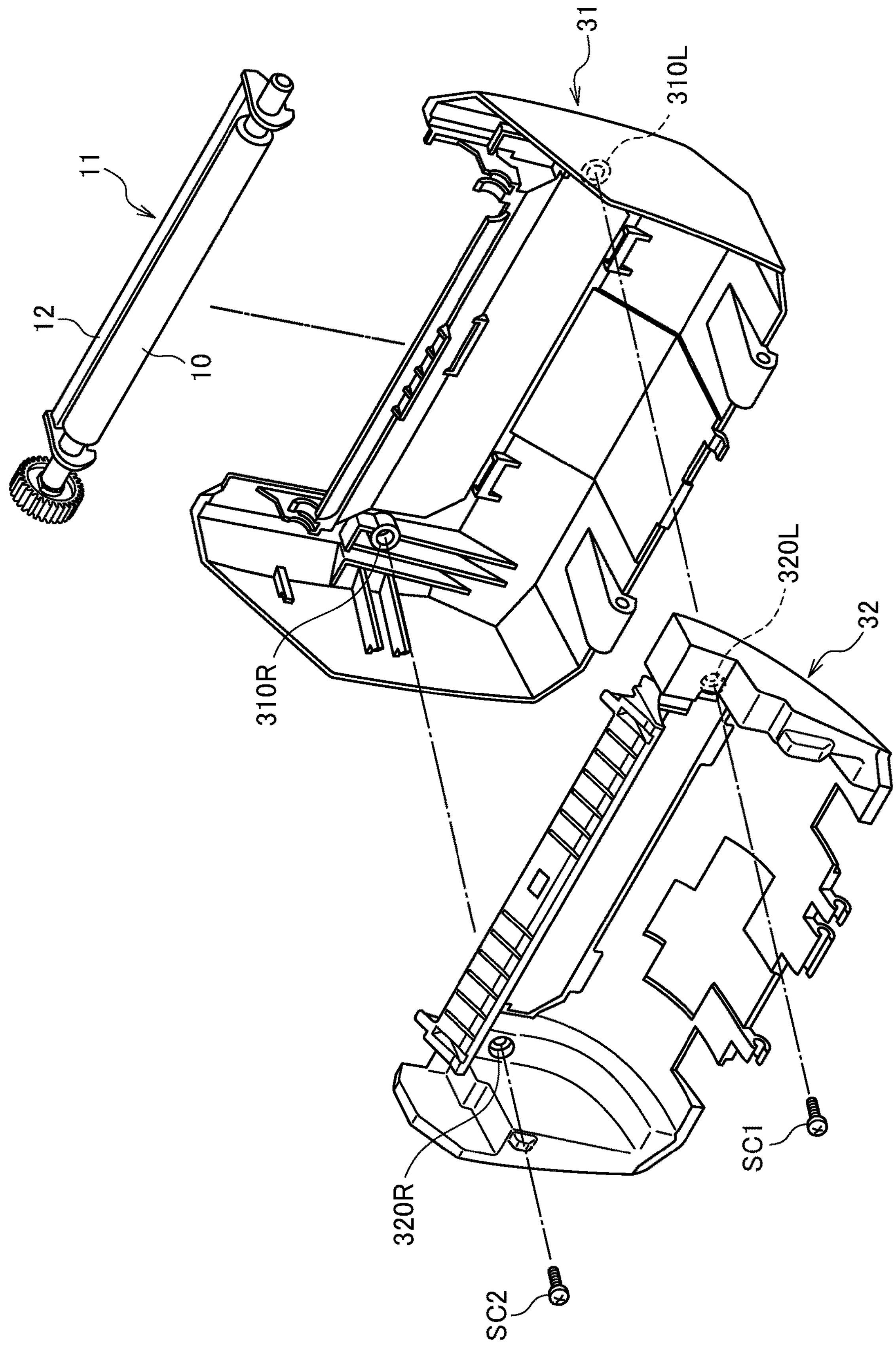
FIG. 5 is an exploded perspective view of the printer cover of the printer of the embodiment.

FIG. 4 shows a coupling structure between the printer cover 3 and the body case 2. FIG. 5 is an exploded perspective view of the printer cover 3.

As shown in FIG. 4, one end of the printer cover 3 is attached with the hinge 8, which has the hinge shaft 81 serving as a swing shaft, whereas the other end of the printer cover 3 is attached with the integrated platen roller 11 (including the platen roller 10 and the peeling bar 12).

The one end of the printer cover 3 is provided with a pair of mounting parts 311L and 311R. The hinge shaft 81 of the hinge 8 passes through the pair of mounting parts 311L and 311R. Both ends of the hinge shaft 81 are attached to mounting parts 23L and 23R of the body case 2, whereby the printer cover 3 is swingably coupled to the body case 2. In more detail, both ends of the hinge shaft 81 are inserted into insertion holes 23Lh and 23Rh that are formed in the mounting parts 23L and 23R of the body case 2. The hinge shaft 81 is inserted into each of the insertion holes 23Lh and 23Rh in an axially movable manner.

A coupling part 832 of a torsion spring 83 of the hinge 8, which will be described later, is inserted into a placement groove 230*d* that is formed in a rear wall 230 of the body case 2, and thus, the torsion spring 83 functions to bias the printer cover 3 to the open position.

In the embodiment shown in FIG. 4, when the printer cover 3 is coupled to the body case 2, the mounting part 23L and the mounting part 311L are disposed adjacent to each other, whereas the mounting part 23R and the mounting part 311R are disposed adjacent to each other. Thus, the mounting parts 311L and 311R of the printer cover 3 are supported by the body case 2, whereby a coupling strength of the printer cover 3 with respect to the body case 2 is increased, and surface contact between the mounting parts enables the printer cover 3 to swing smoothly.

The hinge 8 is formed by integrating an operation member 82 with the hinge shaft 81 into one body. When the printer cover 3 is coupled to the body case 2, the operation member 82 is contained in a containing part 322 formed in the printer cover 3. As described later, the operation member 82 is provided to enable mounting and removing the printer cover 3 to and from the body case 2 without using tools.

As shown in FIG. 5, the printer cover 3 includes an outer printer cover 31 and an inner printer cover 32 that are disposed to overlap each other. The outer printer cover 31 is provided with a pair of fastening parts 310L and 310R, whereas the inner printer cover 32 is provided with a pair of insertion through holes 320L and 320R. Screws SC1 and SC2 are respectively passed through the insertion through holes 320L and 320R of the inner printer cover 32 and are fastened to the fastening parts 310L and 310R of the outer printer cover 31, whereby the outer printer cover 31 and the inner printer cover 32 are combined together.

The integrated platen roller 11 is held by the outer printer cover 31 and the inner printer cover 32 in such a manner as to be caught therebetween. In order to attach and detach the integrated platen roller 11 to and from the printer cover 3, fastening between the outer printer cover 31 and the inner printer cover 32 is released.

The structure of holding the integrated platen roller 11 by the outer printer cover 31 and the inner printer cover 32 will be detailed later.

Figure 6A:
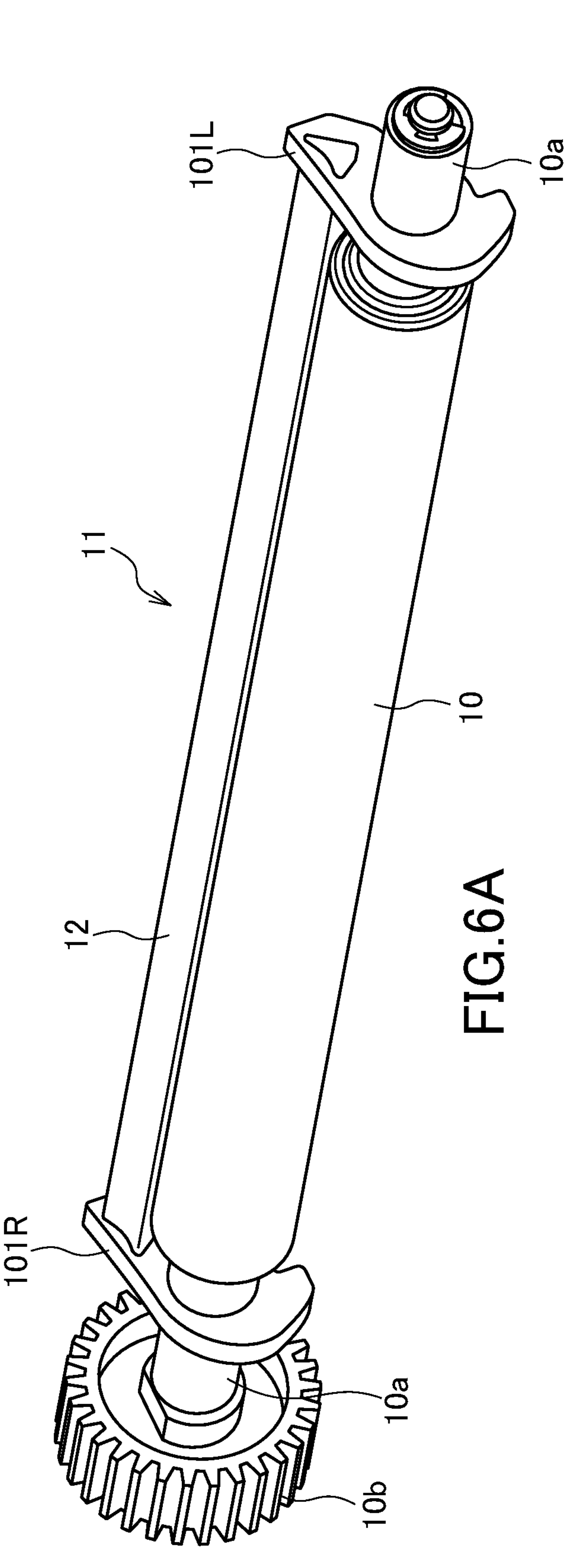
FIG. 6A is a perspective view of an integrated platen roller.
Figure 6B:
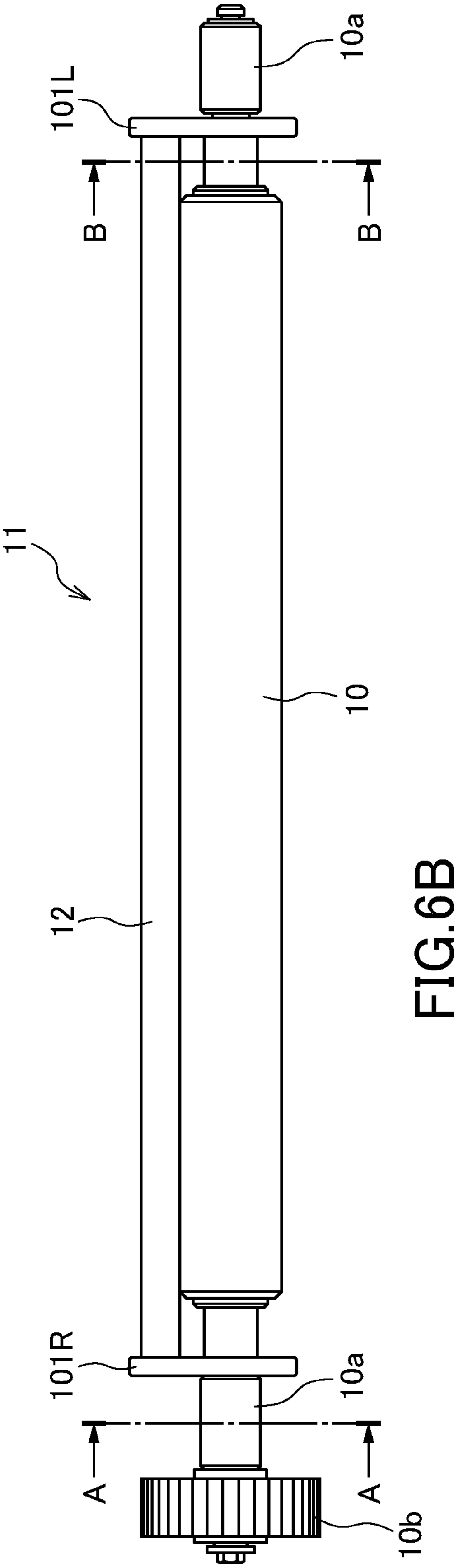
FIG. 6B is a plane view of the integrated platen roller.

The structure of the integrated platen roller 11 held by the printer cover 3 will be described here with reference to FIGS. 6A, 6B, and 7. FIG. 6A is a perspective view of the integrated platen roller, and FIG. 6B is a plane view of the integrated platen roller. FIG. 7 shows an enlarged A-A cross section and an enlarged B-B cross section in FIG. 6B.

As shown in FIGS. 6A and 6B, the integrated platen roller 11 is provided with a pair of arms 101L and 101R (an example of protrusions) at the platen shaft 10*a*, in the vicinity of ends of the platen roller 10. As shown in FIG. 7, the arms 101L and 101R protrude in a normal line direction of the platen shaft 10*a*. The peeling bar 12 is coupled to tips of the arms 101L and 101R in parallel to the platen roller 10. The arm 101L is formed with protrusions 102L and 103L, whereas the arm 101R is formed with protrusions 102R and 103R.

The gear 10*b* is connected to an end of the platen shaft 10*a*. The integrated platen roller 11 is configured so that the platen roller 10 can rotate in response to rotation of the gear 10*b* while the peeling bar 12 and the arms 101L and 101R remain static.

Outer Printer Cover

Next, the outer printer cover 31 will be described with reference to FIGS. 8 to 11.

Figure 8:
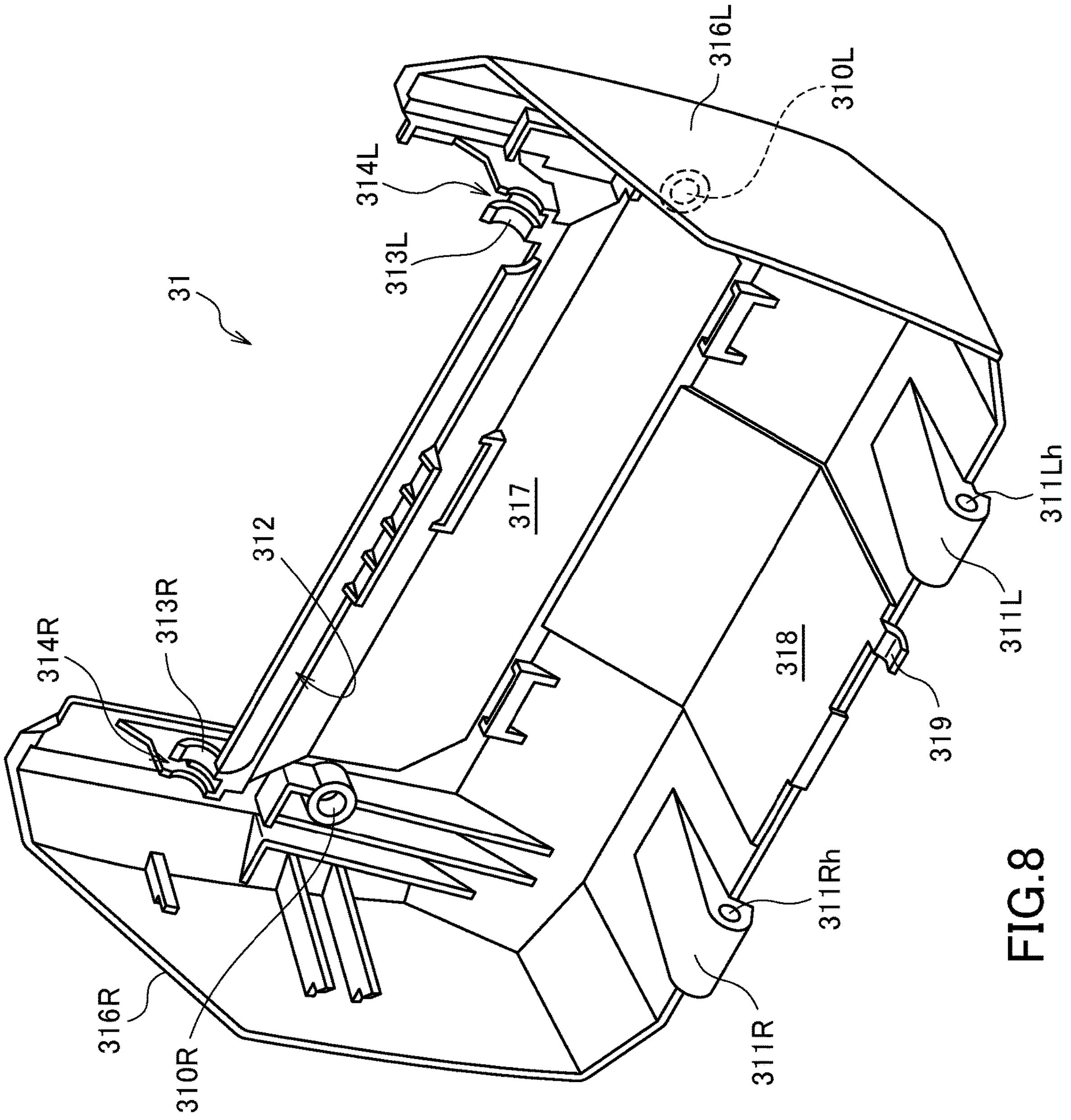
FIG. 8 is a perspective view of an outer printer cover.
Figure 9:
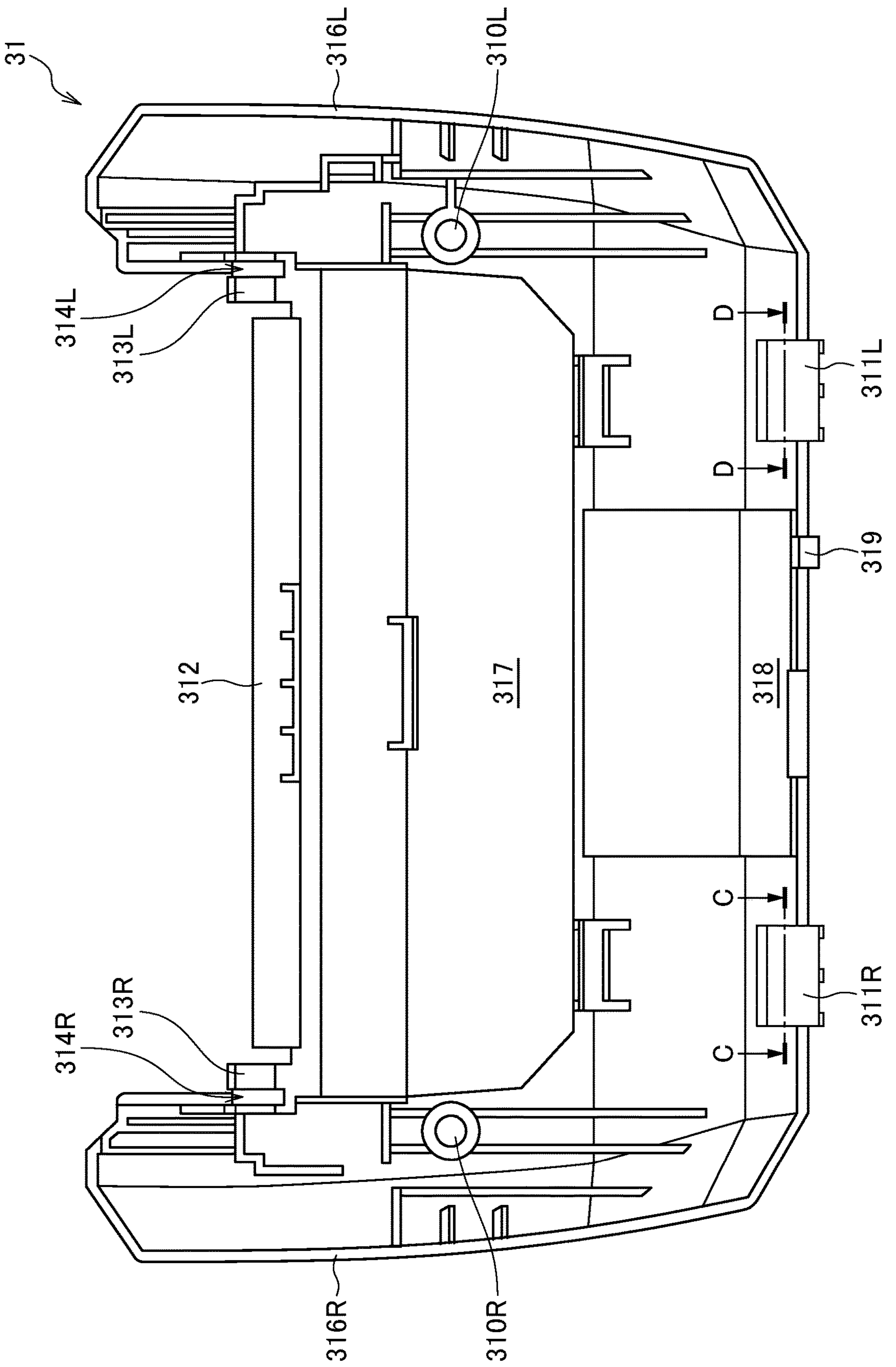
FIG. 9 is a bottom view of the outer printer cover.
Figure 10:
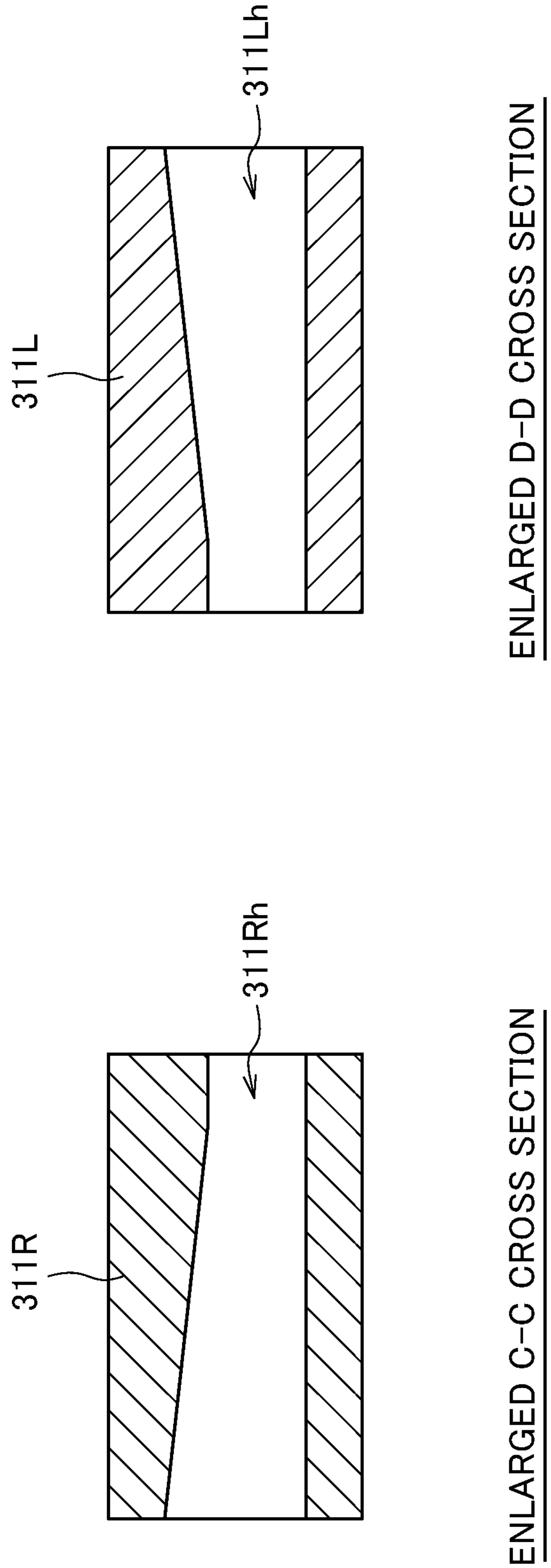
FIG. 10 shows an enlarged C-C cross section and an enlarged D-D cross section in FIG. 9.
Figure 11:
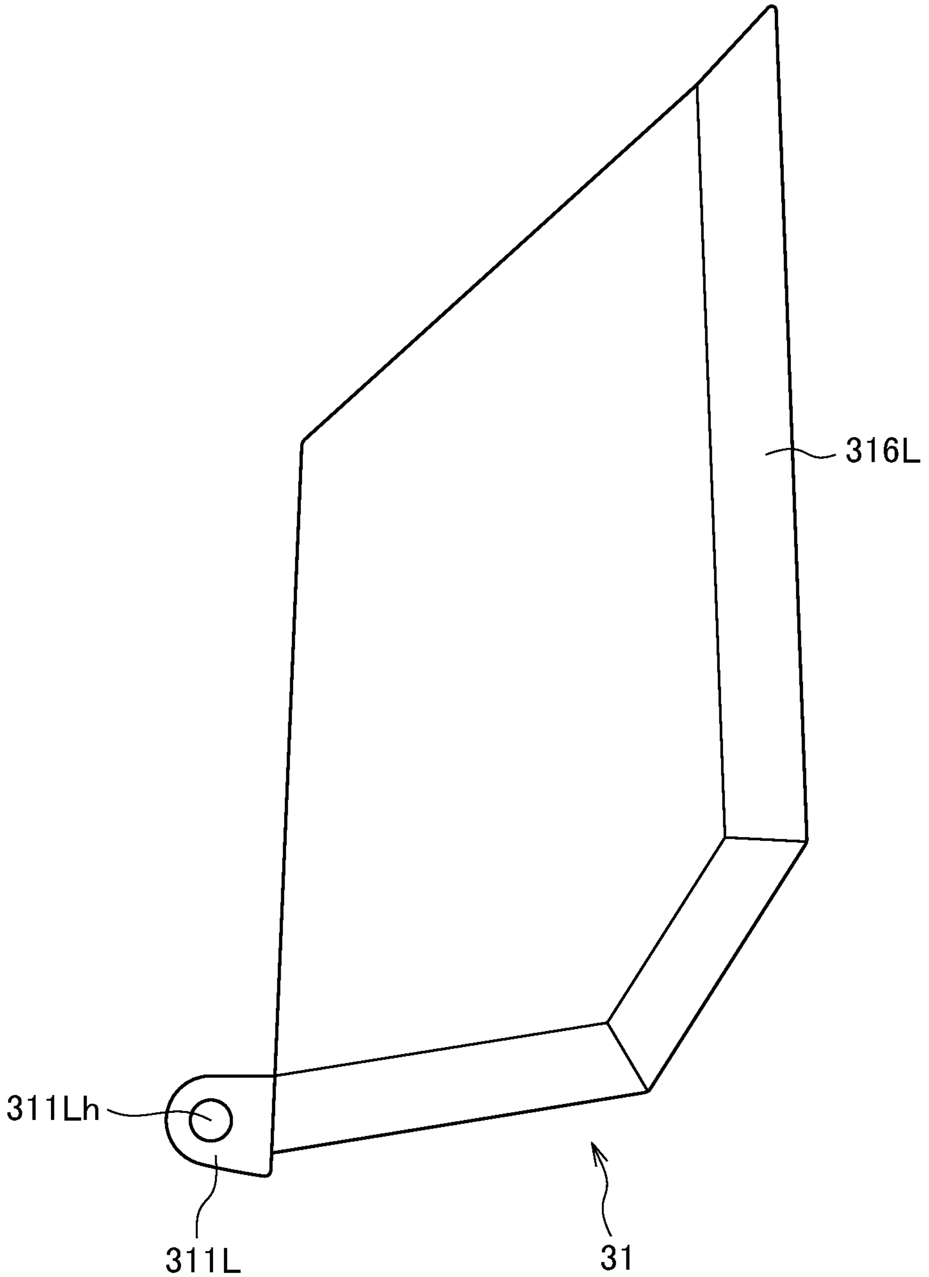
FIG. 11 is a side view of the outer printer cover.

FIG. 8 is a perspective view of the outer printer cover 31. FIG. 9 is a bottom view of the outer printer cover 31. FIG. 10 shows an enlarged C-C cross section and an enlarged D-D cross section in FIG. 9. FIG. 11 is a side view of the outer printer cover 31.

As shown in FIGS. 8 and 9, the outer printer cover 31 is formed of a resin material and has a form in which a ceiling part 317 is surrounded by side walls 316L and 316R and a rear wall 318, and it thereby has a high-strength structure. The side walls 316L and 316R are used as side surfaces of the paper roll-containing chamber 9.

The ceiling part 317 has the fastening parts 310L and 310R for receiving screws, so as to be coupled to the inner printer cover 32.

A platen holder 312 (an example of a second holder), holding pieces 313L and 313R (an example of first holders), and recesses 314L and 314R are provided to an end on a side opposite to the rear wall 318 of the ceiling part 317, as a structure for temporarily holding the integrated platen roller 11. As shown in FIG. 8, each of the holding pieces 313L and 313R has a shape with a circular arc cross section, which is suitable for holding the platen shaft 10*a*.

The platen holder 312 is a member having a circular arc cross section and extending between the holding pieces 313L and 313R and is formed in order to temporarily hold the platen roller 10. When the inner printer cover 32 is not attached to the outer printer cover 31, the platen holder 312 holds the platen roller 10 while being in contact with an outer circumferential surface of the platen roller 10.

On the other hand, when the inner printer cover 32 is attached to the outer printer cover 31, protrusions (not shown) of the inner printer cover 32 push the platen shaft 10*a* to the holding pieces 313L and 313R, and the platen holder 312 is thereby separated from the platen roller 10. Thus, when the outer printer cover 31 and the inner printer cover 32 are coupled to each other, the platen holder 312 is not in contact with the outer circumferential surface of the platen roller 10. As a result, a slight gap is formed between the platen holder 312 and the platen roller 10, which facilitates smooth rotation of the platen roller 10. This gap also functions as a guide for preventing labels from being caught by the platen roller 10, for example, in feeding back perforated labels.

In addition, the platen holder 312 makes it difficult for liquid, such as water, to enter the inside of the inner printer cover 32 that is attached to the outer printer cover 31.

As shown in FIG. 9, the recesses 314L and 314R are respectively disposed outside the holding pieces 313L and 313R and are configured to receive the arms 101L and 101R (refer to FIGS. 6A and 6B) of the integrated platen roller 11. In order to hold the integrated platen roller 11 without a play in the lateral direction, the recesses 314L and 314R are preferably slightly wider than the arms 101L and 101R.

The rear wall 318 is provided with the pair of mounting parts 311L and 311R at an end that is coupled to the hinge 8. As shown in FIGS. 8 and 11, the mounting parts 311L and 311R are respectively formed with insertion holes 311Lh and 311Rh that allow the hinge shaft 81 of the hinge 8 to pass therethrough.

The end of the rear wall 318 is also provided with a holding piece 319. The holding piece 319 is interposed between grasping parts 326*a* and 326*b* (described later) of the inner printer cover 32 that is coupled to the outer printer cover 31. This arrangement restricts lateral movement of the inner printer cover 32 and enables the inner printer cover 32 to swing smoothly when the inner printer cover 32 swings independently of the outer printer cover 31.

The insertion holes 311Lh and 311Rh preferably have a substantially reversely-tapered shape relative to the outside, as shown in FIG. 10. For example, a diameter of an inner end of each insertion hole is made slightly larger than that of the hinge shaft 81, and the diameter of each insertion hole is increased as it goes to the outside. In the embodiment shown in FIG. 10, each insertion hole has the same diameter section from an inner edge and has a reversely-tapered shape from an outer end of the same diameter section to the outside. In another embodiment, each insertion hole may be formed into a reversely-tapered shape as a whole. The insertion holes 311Lh and 311Rh, which have a substantially reversely-tapered shape, allow tilting the hinge shaft 81 along the reversely-tapered shape in the insertion hole when an end of the hinge shaft 81 is inserted from the inner end of each of the insertion holes 311Lh and 311Rh, in attaching the hinge 8 to the printer cover 3. This improves workability in attaching the hinge 8 to the printer cover 3.

It is not necessary to form both of the insertion holes 311Lh and 311Rh into a substantially reversely-tapered shape. It is also possible to form only one of the insertion holes into a substantially reversely-tapered shape, in the condition in which the hinge shaft 81 can be tilted while being inserted in one of the insertion holes.

In the embodiment shown in FIG. 10, a laterally horizontal section is provided in an inside surface of each of the insertion holes 311Lh and 311Rh, which prevents the hinge shaft 81 that is inserted into each insertion hole, from playing. However, the shape is not limited thereto, and the insertion hole may be formed so as to have a substantially conical surface as an inside surface.

In yet another embodiment, the inside surface of the insertion hole may be formed of a combination of two or more cylindrical surfaces in which diameters increase toward the outside, instead of a reversely-tapered shape. That is, the insertion hole may have a stepped cross section in a sectional view shown in FIG. 10.

Inner Printer Cover

Next, the inner printer cover 32 will be described with reference to FIGS. 12 to 14.

Figure 12:
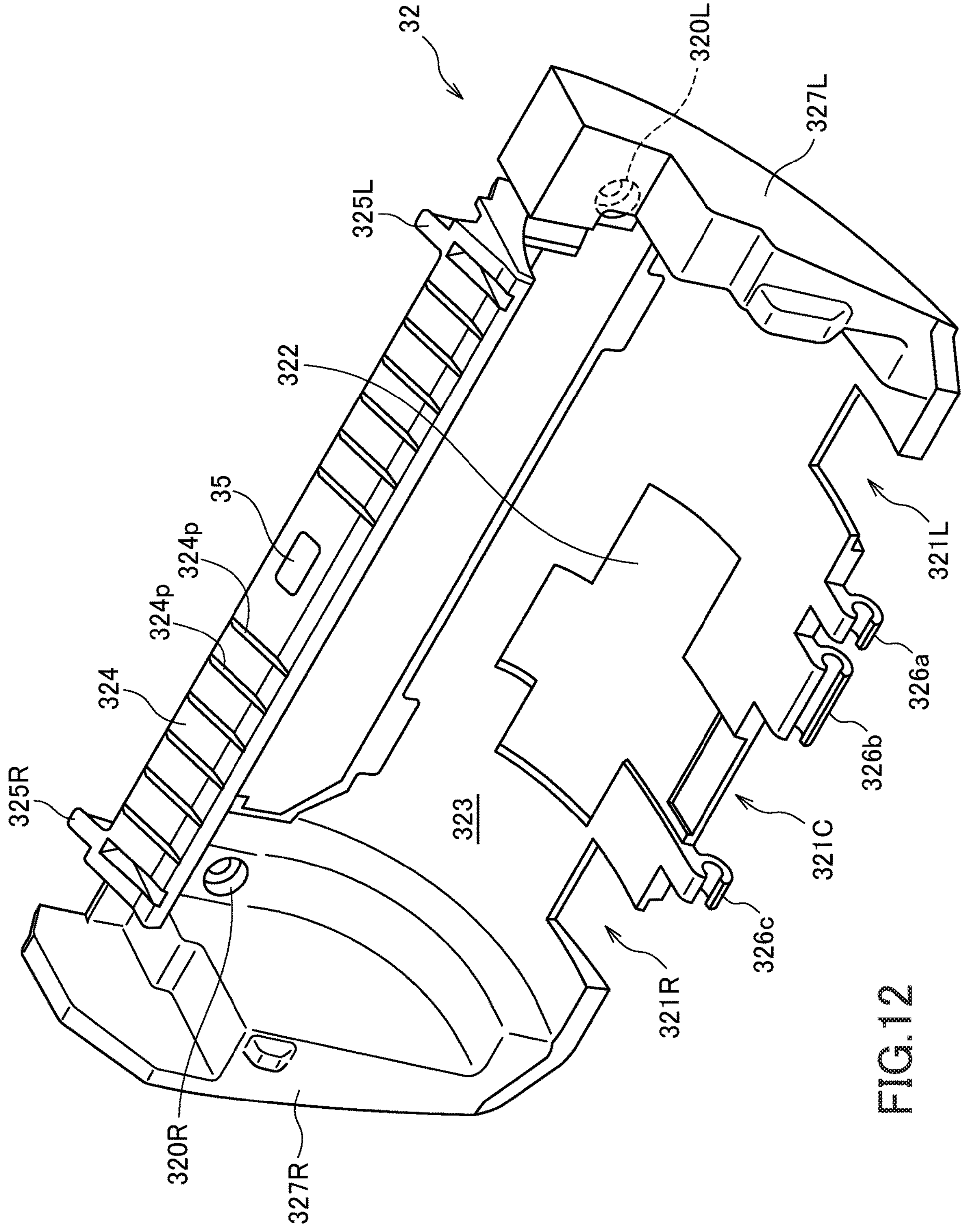
FIG. 12 is a perspective view of an inner printer cover.

FIG. 12 is a perspective view of the inner printer cover 32. FIG. 13 is a bottom view of the inner printer cover 32. FIG. 14 is a side view of the inner printer cover 32.

Figure 13:
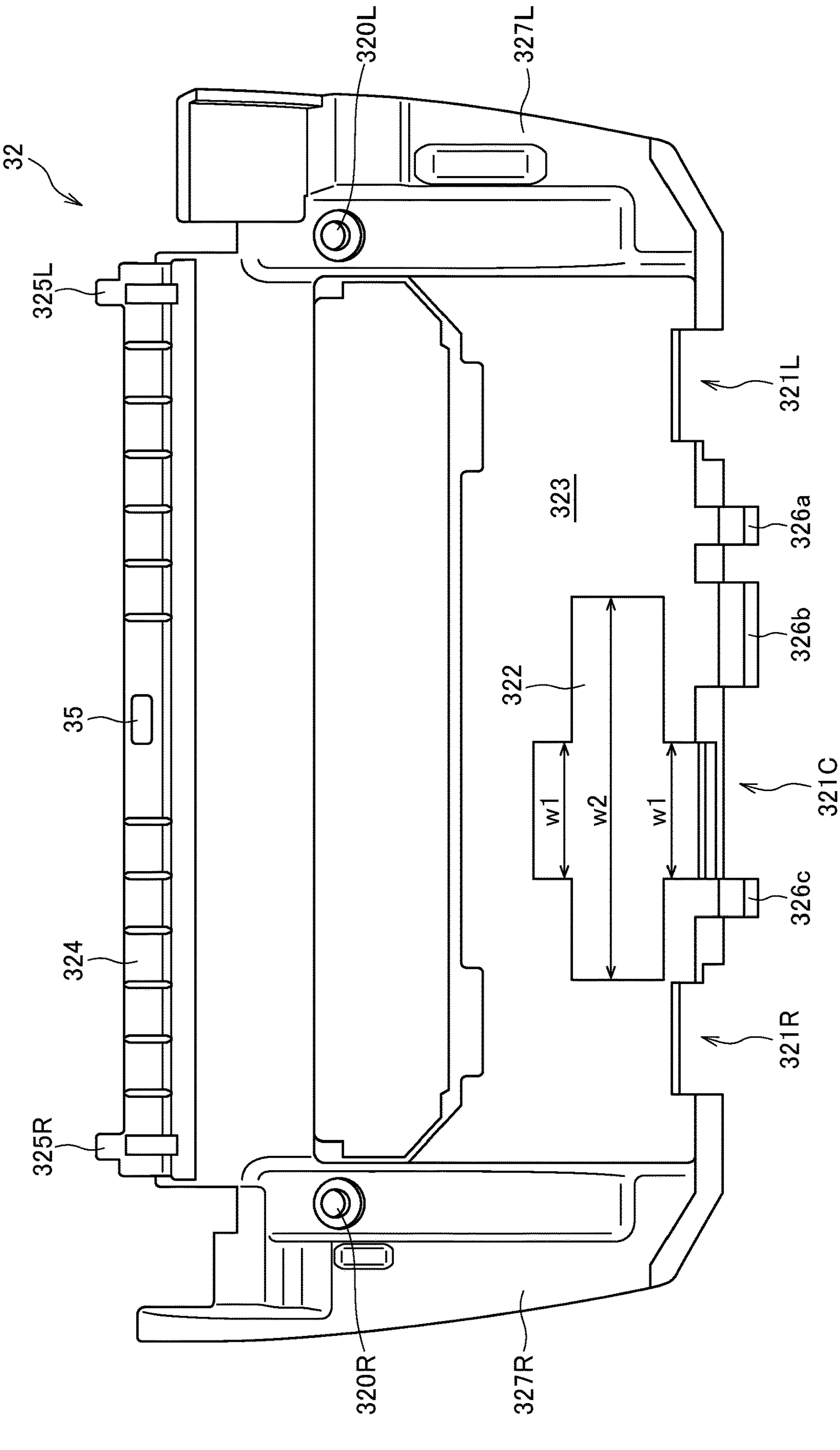
FIG. 13 is a bottom view of the inner printer cover.
Figure 14:
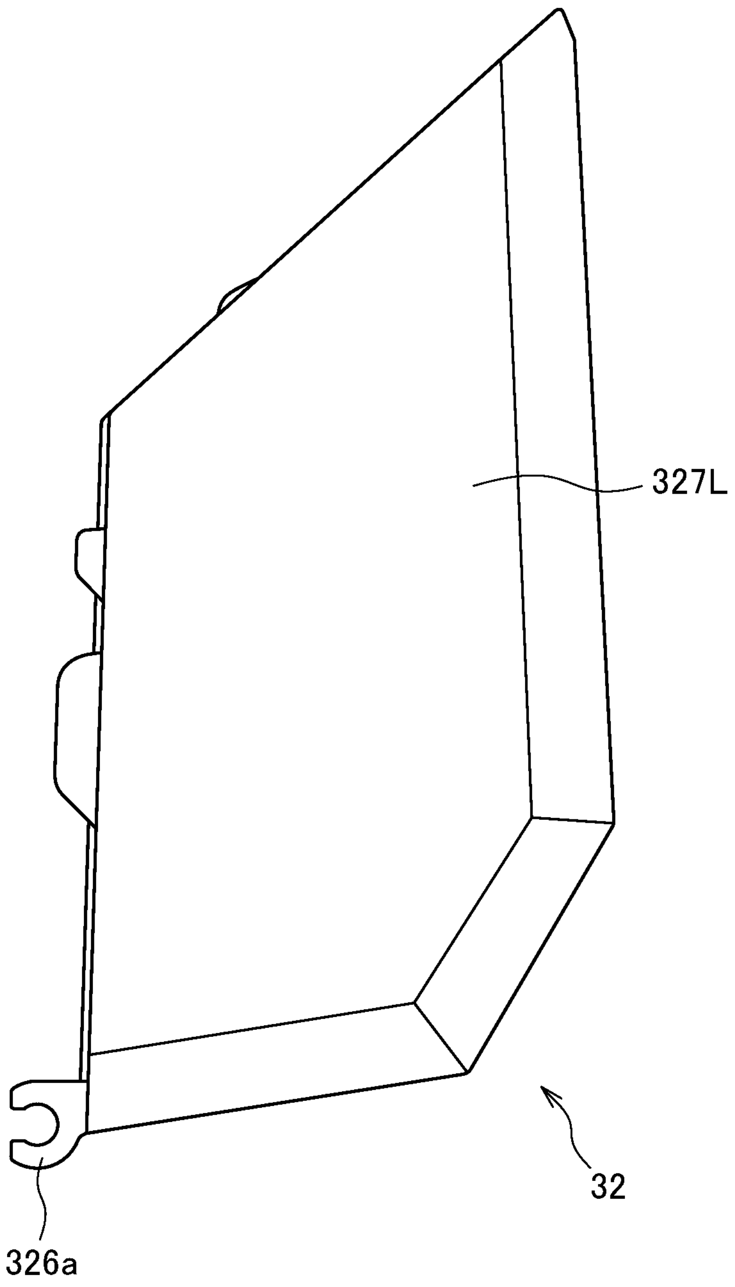
FIG. 14 is a side view of the inner printer cover.

As shown in FIGS. 12 and 13, the inner printer cover 32 is formed of a resin material and has a form in which thick side walls 327L and 327R are joined to a curved part 323 that has a curved surface in accordance with the surface of the paper roll “R,” and it thereby has a strong structure. The side walls 327L and 327R are used as side surfaces of the paper roll-containing chamber 9.

The curved part 323 has the insertion through holes 320L and 320R for allowing screws to pass therethrough, so as to be coupled to the outer printer cover 31.

The curved part 323 has grasping parts 326*a*, 326*b*, and 326*c* for grasping the hinge shaft 81 of the hinge 8, at one end. As shown in FIG. 14, each grasping part has a C-shaped cross section or a U-shaped cross section and allows the hinge shaft 81 to be inserted thereinto from a direction perpendicular to the axial direction.

Although three grasping parts are provided in the embodiment shown in FIG. 12, the number of the grasping parts is not limited thereto. It is possible to alter or modify the positions on the axis of the hinge shaft 81, the axial direction widths, and the number, of the grasping parts, as appropriate.

The one end of the curved part 323 is formed with cut parts 321L, 321R, and 321C. The cut parts 321L and 321R are cut so as to expose the mounting parts 311L and 311R (refer to FIG. 8) of the outer printer cover 31. The cut part 321C is cut so as to receive the operation member 82 (refer to FIG. 4) of the hinge 8. The cut part 321C continues to the containing part 322.

The containing part 322 is a recess that is formed in a part of the surface of the curved part 323 so as to contain the operation member 82 of the hinge 8. In mounting the printer cover 3 to the body case 2, the operation member 82 is contained in the containing part 322. In removing the printer cover 3 from the body case 2, the operation member 82 is taken out of the containing part 322. The depth of the recess of the containing part 322 is not limited; but from the point of view of ease of taking out the operation member 82, it is preferable to provide space enough to insert a finger between the operation member 82 and a bottom surface when the operation member 82 is in the contained state.

In an embodiment, as shown in FIG. 13, the containing part 322 preferably has a section having a width W1 in the lateral direction and a section having a width W2 in the lateral direction greater than the width W1. The example of the containing part 322 shown in FIG. 13 has a cross shape as a whole.

The operation member 82 of the hinge 8 has a lateral width that is the same as or slightly smaller than the width W1 so as to be fitted in the containing part 322. Thus, the operation member 82 does not come off from the containing part 322 unless an external force is applied, and axial movement of the hinge 8 is restricted.

The containing part 322, which has the section having a width W2 in the lateral direction, exposes at least a part of a side surface of the operation member 82 although the operation member 82 is contained therein, whereby a user can insert a finger to release the operation member 82 fitted to the containing part 322.

In order to make the operation member 82 hardly come off from the containing part 322 when contained therein, it is preferable to provide a protrusion (refer to FIG. 15) to each side surface at a distal end of the operation member 82 and is also preferable to provide a recess (not shown) in each corresponding side surface of the containing part 322. The protrusion of the operation member 82 is fitted to the recess of the containing part 322, whereby the operation member 82 is unlikely to come off from the containing part 322.

As shown in FIG. 12, the other end of the curved part 323 is formed with a paper guide 324. The paper guide 324 extends over between the side walls 327L and 327R.

The paper guide 324 has a surface (an example of a first surface) that faces a feeding path in which the continuous paper “P” pulled out of the paper roll “R” is fed to the platen roller 10, when the printer cover 3 is in the closed state. The surface of the paper guide 324 is provided with a sensor 35. It is preferable to provide one or a plurality of ridge parts 324*p* on the surface of the paper guide 324 so that the continuous paper “P” pulled out of the paper roll “R” is fed smoothly. In an exemplary case of printing a continuous label having an adhesive surface on one side (label without a liner), providing a ridge part 324*p* is especially effective in order to prevent the adhesive surface from adhering to the paper guide 324.

The surface that is provided with the ridge part 324*p*, of the paper guide 324, is disposed on an upstream side of the platen roller 10 when the printer cover 3 is at the closed position, and it has a shape along a feeding direction of the continuous paper "P."

Cover parts 325L and 325R are provided to the paper guide 324 in the vicinity of the side walls 327L and 327R, respectively. As shown in FIGS. 12 and 13, the cover parts 325L and 325R protrude from an end of the paper guide 324. As described later, when the inner printer cover 32 is coupled to the outer printer cover 31, the cover parts 325L and 325R are respectively disposed to face the holding pieces 313L and 313R (refer to FIG. 8) of the outer printer cover 31 and pinch the platen shaft 10*a* in cooperation with the holding pieces 313L and 313R.

As shown in FIG. 4, when the integrated platen roller 11 is attached to the printer cover 3, the gear 10*b* of the integrated platen roller 11 is disposed on the right side. In view of this, for the purpose of avoiding attaching the integrated platen roller 11 to the printer cover 3 while the gear 10*b* is wrongly disposed on the left side, it is preferable that the gear 10*b* in the state of being disposed on the left side interferes with the inner printer cover 32 to inhibit the inner printer cover 32 from being assembled to the outer printer cover 31. In other words, the inner printer cover 32 is preferably configured as follows: When the platen shaft 10*a* is held by the outer printer cover 31 so that the gear 10*b* will be disposed on the right side in the axial direction of the platen shaft 10*a*, the gear 10*b* does not come into contact (interfere) with the inner printer cover 32. When the platen shaft 10*a* is held by the outer printer cover 31 so that the gear 10*b* will be disposed on the left side, the gear 10*b* comes into contact (interferes) with the inner printer cover 32.

Specifically, a protrusion may be provided to an outer surface of the inner printer cover 32 so as to interfere with the gear 10*b* when the integrated platen roller 11 is set to the outer printer cover 31 in such a manner that the gear 10*b* is disposed on the left side.

The inner printer cover 32 is attached to the outer printer cover 31, as shown in FIG. 5, whereby the printer cover 3 is completed. The outer printer cover 31 and the inner printer cover 32 each have side walls, and therefore, the printer cover 3 has a very high strength as a whole.

Structure of Hinge and Method of Mounting Printer Cover to Body Case

Next, a structure of the hinge 8 and a method of mounting the printer cover 3 to the body case 2 will be described with reference to FIGS. 15 to 17.

Figure 15:
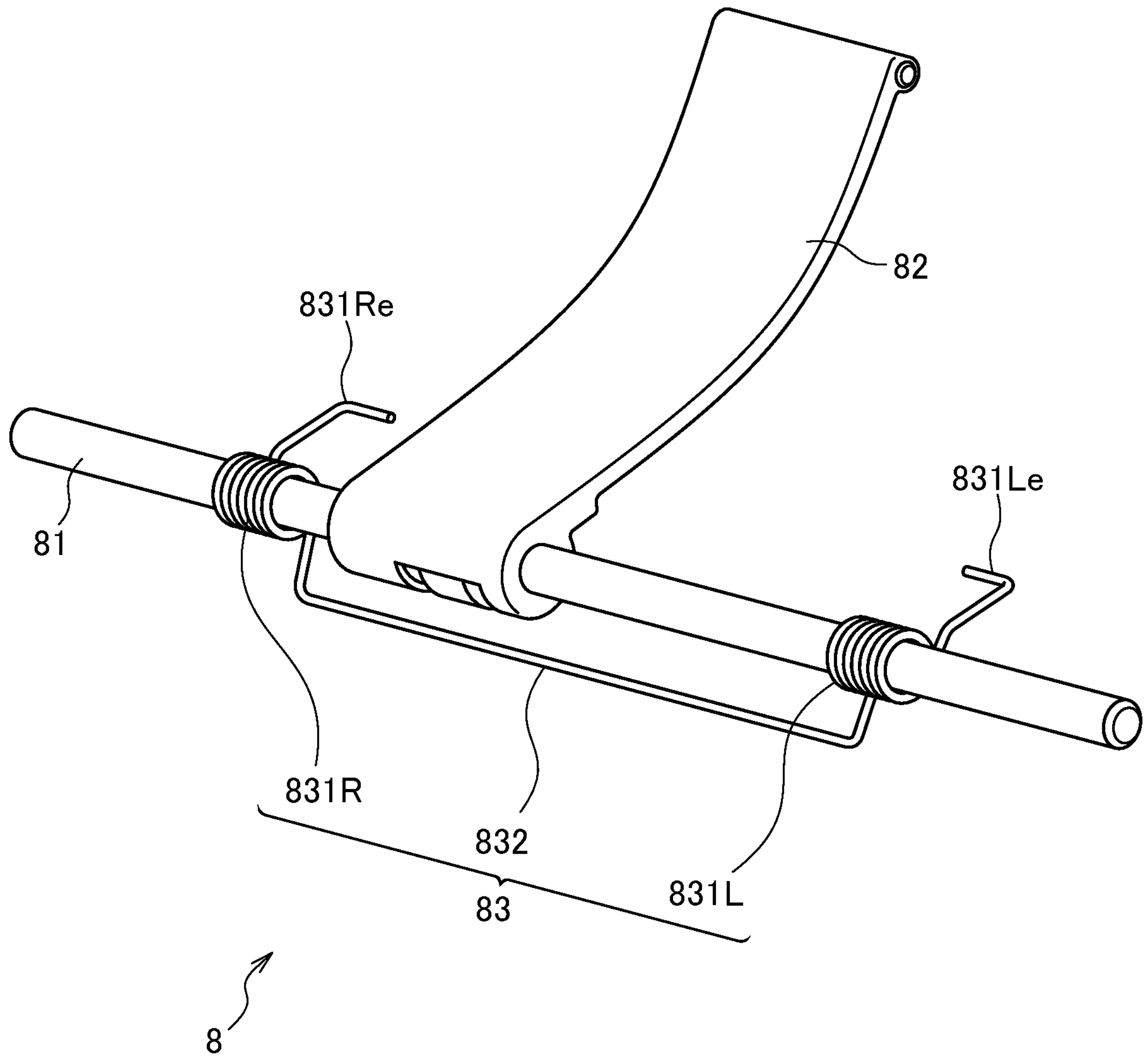
FIG. 15 is a perspective view of a hinge used in coupling the outer printer cover and the inner printer cover.

FIG. 15 is a perspective view of the hinge 8 used in coupling the outer printer cover 31 and the inner printer cover 32. FIGS. 16 and 17 illustrate the method of mounting the outer printer cover 31 and the inner printer cover 32 by using the hinge 8, in a sequential manner.

First, with reference to FIG. 15, the hinge 8 has the hinge shaft 81, the operation member 82, and the torsion spring 83.

The operation member 82 is a member that is integrally formed with the hinge shaft 81 into one body and that is held by a user who intends to move the hinge shaft 81 in the axial direction in attaching and detaching the hinge 8 to and from the printer cover 3. The operation member 82 is configured to restrict axial movement of the hinge shaft 81 when it is contained in the containing part 322 of the printer cover 3 and to release the restricted axial movement of the hinge shaft 81 when it is not contained in the containing part 322.

In an embodiment, an inner surface of the operation member 82 is curved so as to be on substantially the same plane as that of the curved surface of the curved part 323 when the operation member 82 is contained in the containing part 322 of the inner printer cover 32; however, the shape of the inner surface of the operation member 82 is not limited thereto. Herein, the inner surface of the operation member 82 is a surface on a side opposite to a surface that faces the curved part 323 of the inner printer cover 32 when the operation member 82 is attached to the printer cover 3. The inner surface of the operation member 82 and the curved surface of the curved part 323 are substantially on the same plane, which provides an excellent appearance to the inner side of the printer cover 3 and enables decreasing a clearance between the curved surface of the curved part 323 and the paper roll "R," resulting in reduction in size of the printer 1.

The torsion spring 83 biases in such a manner as to swing the printer cover 3 to the open position when the hinge 8 is attached to the body case 2 and the printer cover 3, as described above. The torsion spring 83 is made of metal, for example. As shown in FIG. 15, the torsion spring 83 has wound parts 831L and 831R that are wound around the hinge shaft 81 and also has a coupling part 832 that couples the wound parts 831L and 831R together.

As shown in FIG. 4, the coupling part 832 is placed in the placement groove 230*d* of the body case 2. Ends 831Le and 831Re of the wound parts 831L and 831R are disposed on an inner surface of the printer cover 3 (that is, an inner surface of the inner printer cover 32). With this structure, when the printer cover 3 is at the closed position, biasing forces for swinging the printer cover 3 to the open position are generated at points of application at which the ends 831Le and 831Re of the wound parts 831L and 831R are in contact with the printer cover 3.

Figure 16:
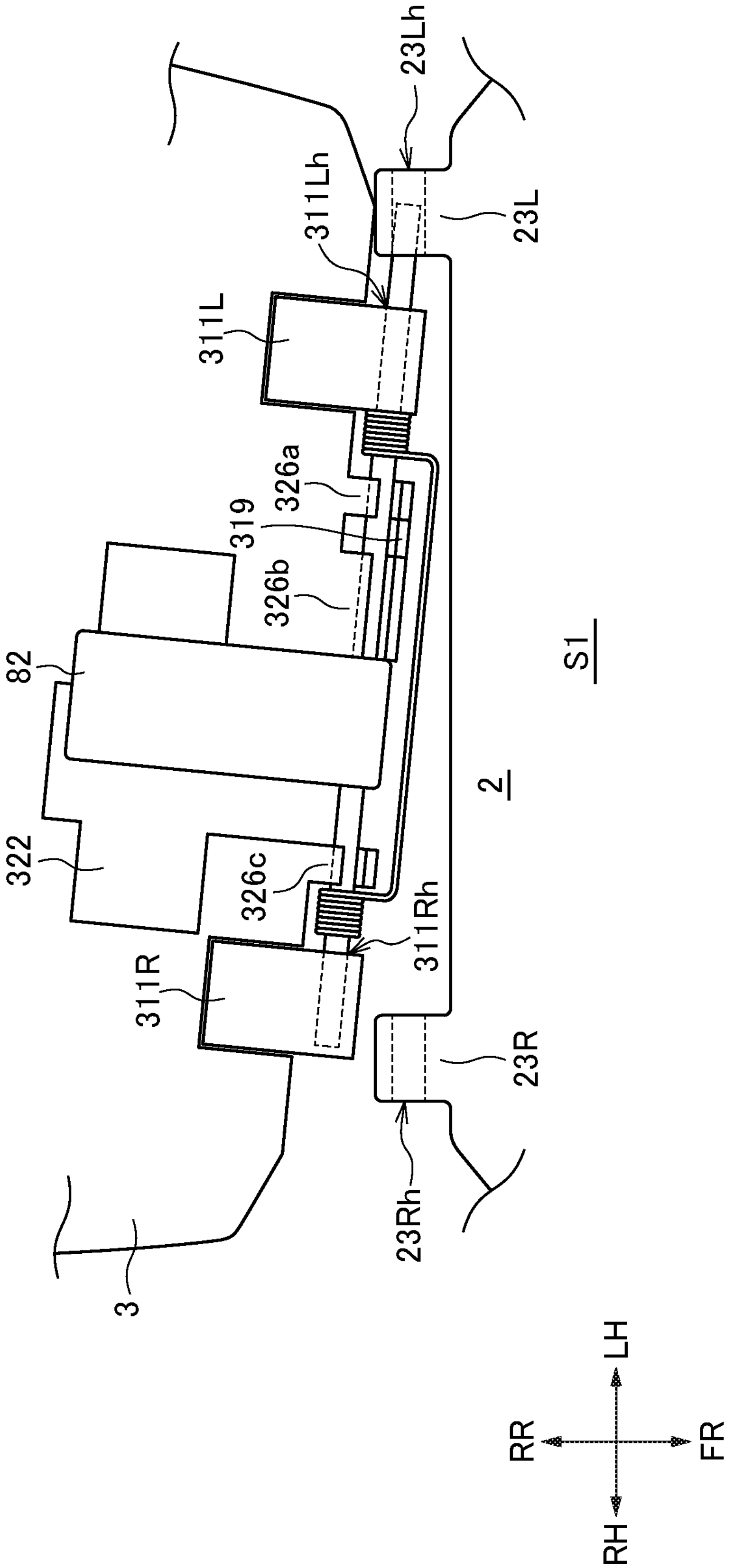
FIG. 16 illustrates a method of mounting the outer printer cover and the inner printer cover by using the hinge.

As shown in FIG. 16, the operation member 82 is preferably coupled to the hinge shaft 81 at a position separated from the center of the hinge shaft 81. This enables assembling the torsion spring 83 by inserting the hinge shaft 81 into the wound parts 831L and 831R even when a distance between the wound parts 831L and 831R is reduced, resulting in improvement in assemblability and contribution to reduction in size of the torsion spring 83.

Next, the method of mounting the printer cover 3 to the body case 2 by using the hinge 8 will be described. FIGS. 16 and 17 illustrate states S1 to S3 that show a mounting procedure.

First, the hinge 8 is attached to the printer cover 3. Specifically, both ends of the hinge shaft 81 are sequentially inserted into the insertion holes 311Lh and 311Rh of the mounting parts 311L and 311R, whereby the hinge 8 is attached to the printer cover 3. At this time, due to the grasping parts 326*a*, 326*b*, and 326*c* of the printer cover 3 having a C-shaped cross section or a U-shaped cross section, the hinge shaft 81 can be inserted from the opening of each grasping part.

Then, an end of the hinge shaft 81 of the hinge 8 is inserted into one of the insertion hole 23Lh of the mounting part 23L and the insertion hole 23Rh of the mounting part 23R of the body case 2 (in FIG. 16, the insertion hole 23Lh).

Herein, the insertion holes 23Lh and 23Rh are preferably formed so that the hinge shaft 81 can move therein, in a direction perpendicular to the axial direction. For example, the insertion holes 23Lh and 23Rh are holes oblong in the front-rear direction. This structure enables tilting the hinge shaft 81 relative to the insertion hole (in FIG. 16, the insertion hole 23Lh) of the body case 2, as shown in FIG. 16, resulting in improving operability in inserting the hinge shaft 81 of the hinge 8 attached to the printer cover 3, into the insertion hole of the body case 2.

When the hinge 8 is attached to the printer cover 3, a user can move the hinge shaft 81 in the axial direction by holding the operation member 82. Thus, a user moves the hinge shaft 81 to the left side by operating the operation member 82, as shown by the states S1 and S2. In response to this, the right end of the hinge shaft 81 enters the inside of the mounting part 311R, and the mounting part 311R can be positioned on the left side of the mounting part 23R of the body case 2.

Next, as shown by the state S3, the user moves the hinge shaft 81 to the right side by operating the operation member 82 and inserts the right end of the hinge shaft 81 into the insertion hole 23Rh of the mounting part 23R. Then, the operation member 82 is contained in the containing part 322, whereby mounting of the printer cover 3 to the body case 2 is completed.

As described above, using the hinge 8 enables mounting the printer cover 3 to the body case 2 without the need of tools. The printer cover 3 can be removed from the body case 2 by performing an operation in a reverse manner to obtain states from the state S3 to the state S1, which also does not need tools.

Moreover, when the printer cover 3 is mounted to the body case 2, both ends of the hinge shaft 81 are held by the mounting parts 23L and 23R of the body case 2 and the mounting parts 311L and 311R of the printer cover 3, and the operation member 82 is restricted in axial movement in the containing part 322. This structure makes the printer cover 3 hardly come off from the body case 2.

In an embodiment, as shown in FIG. 16, when the hinge 8 is attached to the printer cover 3, axial movement of the operation member 82 is restricted (limited) between the adjacent two grasping parts 326*b* and 326*c*. Under these conditions, a user is unlikely to move the hinge shaft 81 to the left side in such a manner that the right end of the hinge shaft 81 is pulled out of the insertion hole 311Rh of the mounting part 311R in FIG. 16, whereby good operability is provided in mounting the printer cover 3. In short, an end of the grasping part 326*b* functions as a stopper of the operation member 82.

The axial positions of the two insertion holes 311Lh and 311Rh, in which the hinge shaft 81 is inserted, are not limited, but it is preferable to increase the distance between the two insertion holes 311Lh and 311Rh as long as possible. Increasing the distance between the two insertion holes improves strength of the printer cover 3 with respect to the body case 2 against, in particular, an external force in a torsional direction.

Although FIG. 16 shows an example of providing the wound parts 831L and 831R (refer to FIG. 15) of the torsion spring 83 on inner sides of the mounting parts 311L and 311R, as an embodiment, the position of the torsion spring 83 is not limited thereto. The torsion spring 83 can be formed so that the wound parts will be interposed between the mounting part 23L and the mounting part 311L and between the mounting part 23R and the mounting part 311R.

For the hinge and the structure for attaching the hinge of the printer cover, various embodiments can be implemented. Hereinafter, other embodiments will be described with reference to FIGS. 18A, 18B and 19.

Providing the grasping parts 326*a* to 326*c* as shown by the embodiment in FIG. 12 improves strength of the hinge 8 (that is, resistance of the printer cover 3 against coming off from the body case 2, for example, at the time of impact due to fall). However, in another embodiment, one, some, or all of the grasping parts 326*a* to 326*c* may not be provided. In an exemplary embodiment shown in FIG. 18A, the printer cover does not have a grasping part, but it is provided with mounting parts 311AL and 311AR. Both ends of the hinge shaft 81 are attached to the mounting parts 23L and 23R of the body case 2, in the same manner as in the state S3 in FIG. 17. Also, in the embodiment shown in FIG. 18A, mounting and removing of the printer cover 3 to and from the body case 2 does not require tools, and this structure makes the printer cover 3 hardly come off from the body case 2.

Figures 18A, 18B:
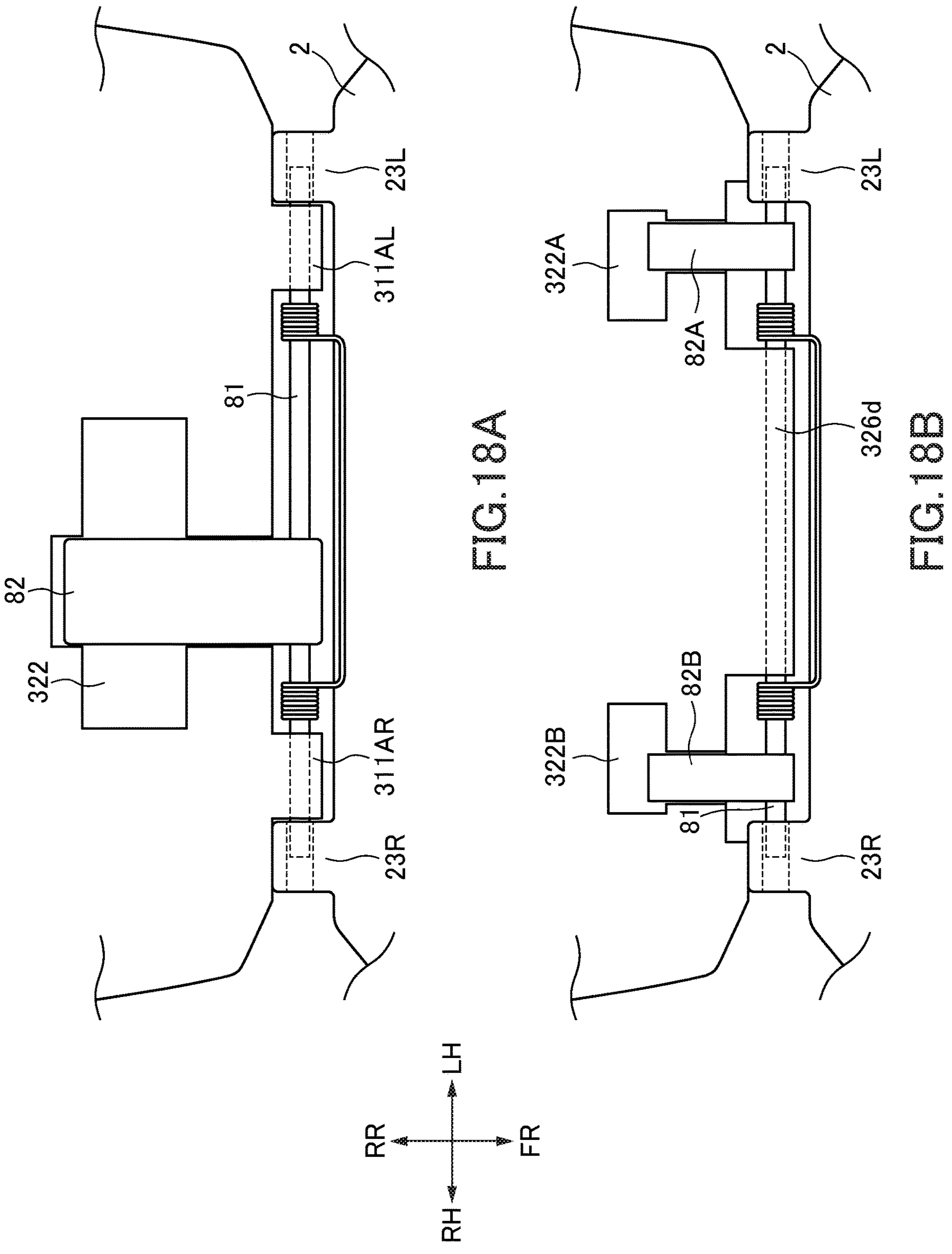
FIGS. 18A and 18B each illustrate another embodiment of a coupling mechanism between the outer printer cover and the inner printer cover with the use of the hinge.

FIG. 18B shows an embodiment in which a hinge has two operation members 82A and 82B. In this manner, the number of the operation members of the hinge may not be one. In addition, one wide-width grasping part 326*d* is provided to the printer cover.

In the embodiment shown in FIG. 18B, containing parts 322A and 322B for containing the two operation members 82A and 82B are formed in the printer cover.

Although the embodiment shown in FIGS. 4 to 17 includes the printer cover 3 that has a two-layer structure of the outer printer cover 31 and the inner printer cover 32, providing the two-layer structure to the printer cover, and the structure for attaching the hinge of the printer cover, are not directly related to each other. Thus, the mechanism of mounting the printer cover to the body case by using the hinge in each embodiment can be implemented also in a single-layer printer cover. For example, it is obvious that the printer cover shown in each of the embodiments in FIGS. 18A and 18B can be implemented also by a single-layer printer cover.

Figure 19A:
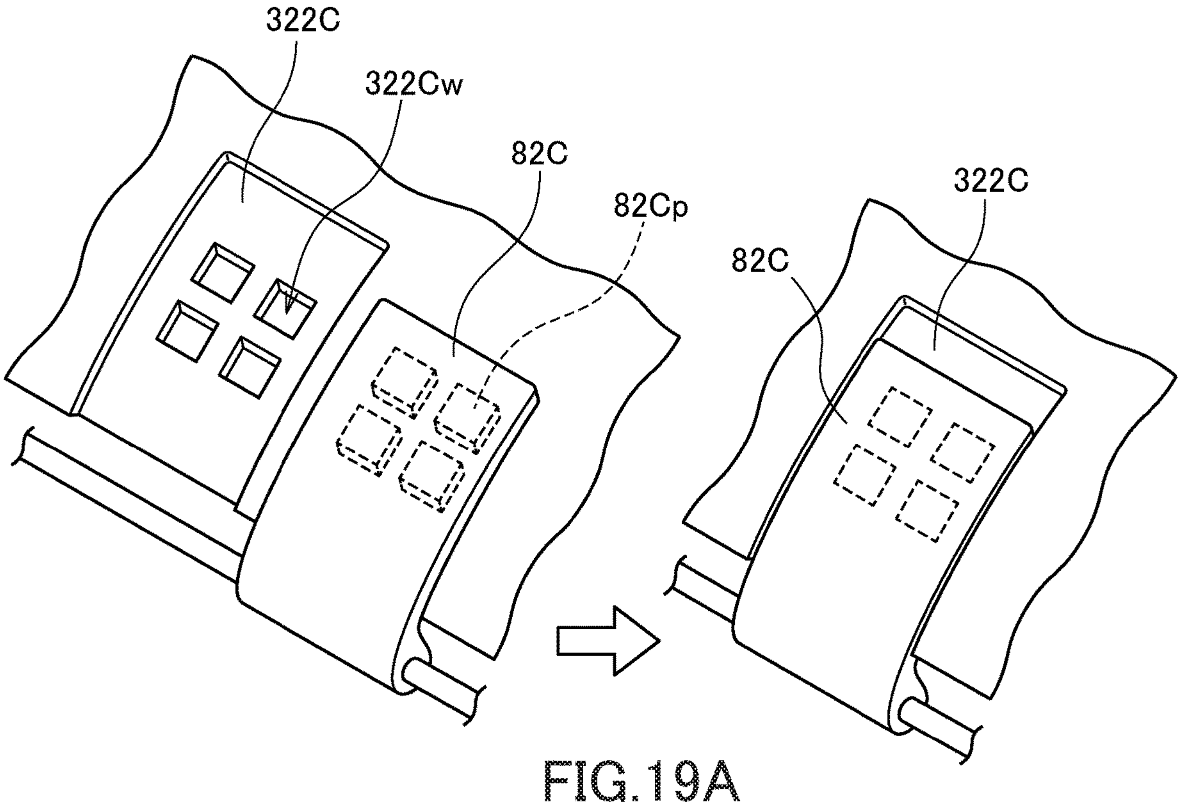
FIGS. 19A and 19B each illustrate another embodiment of an operation member and a containing part.
Figure 19B:
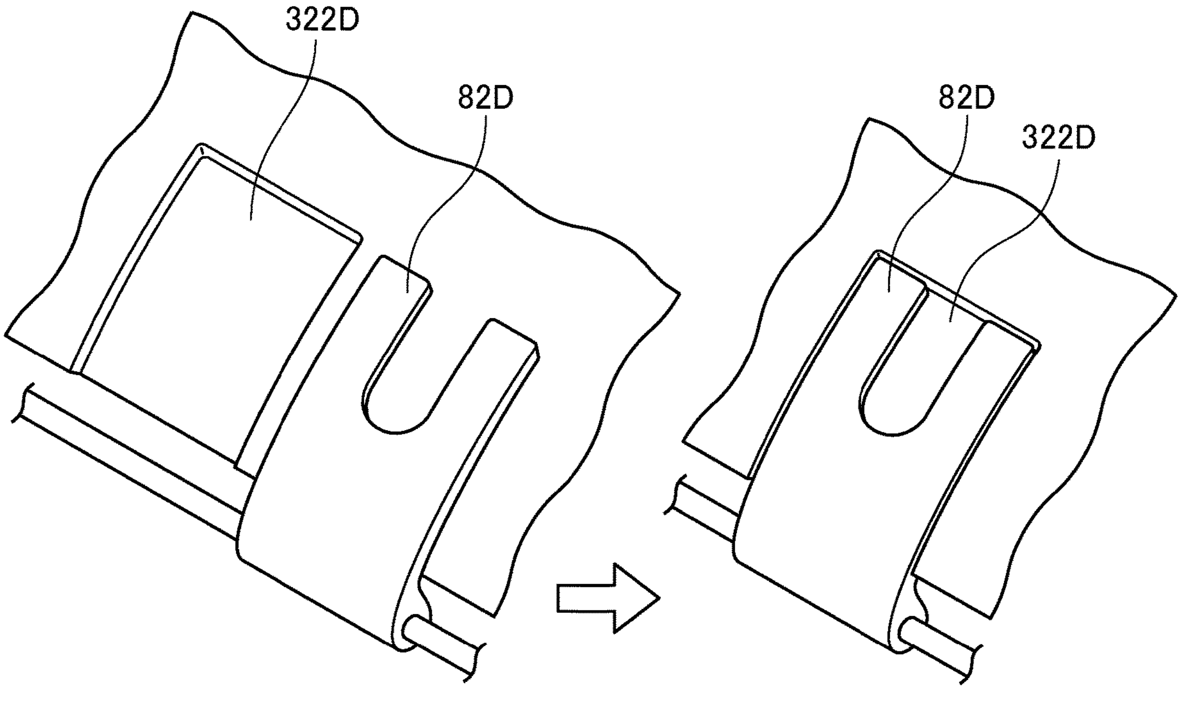

Each of FIGS. 19A and 19B shows an operation member according to another embodiment. The operation member that is provided to the hinge may have various shapes.

For example, in an embodiment shown in FIG. 19A, an operation member 82C is formed with protrusions 82Cp. A containing part 322C corresponding to the operation member 82C is provided on the inner surface of the printer cover. The containing part 322C is formed with recesses 322Cw. The operation member 82C is contained in the containing part 322C while the protrusions 82Cp of the operation member 82C are fitted into the recesses 322Cw of the containing part 322C, whereby the force for restricting axial movement is stronger than that in the case of the operation member 82 shown in FIG. 17.

FIG. 19B shows an embodiment in which an operation member 82D has a U-shape. A containing part 322D for containing the operation member 82D is provided on the inner surface of the printer cover. In this embodiment, although the lateral widths of the operation member 82D and the containing part 322D are approximately the same, the operation member 82D can be taken out of the containing part 322D by inserting a finger toward the surface of the containing part 322D, which is exposed due to the U-shape of the operation member 82D.

Mechanism for Attaching Integrated Platen Roller

Next, a mechanism for attaching the integrated platen roller 11 by using the printer cover 3 will be described with reference to FIGS. 20 to 24.

Figure 17:
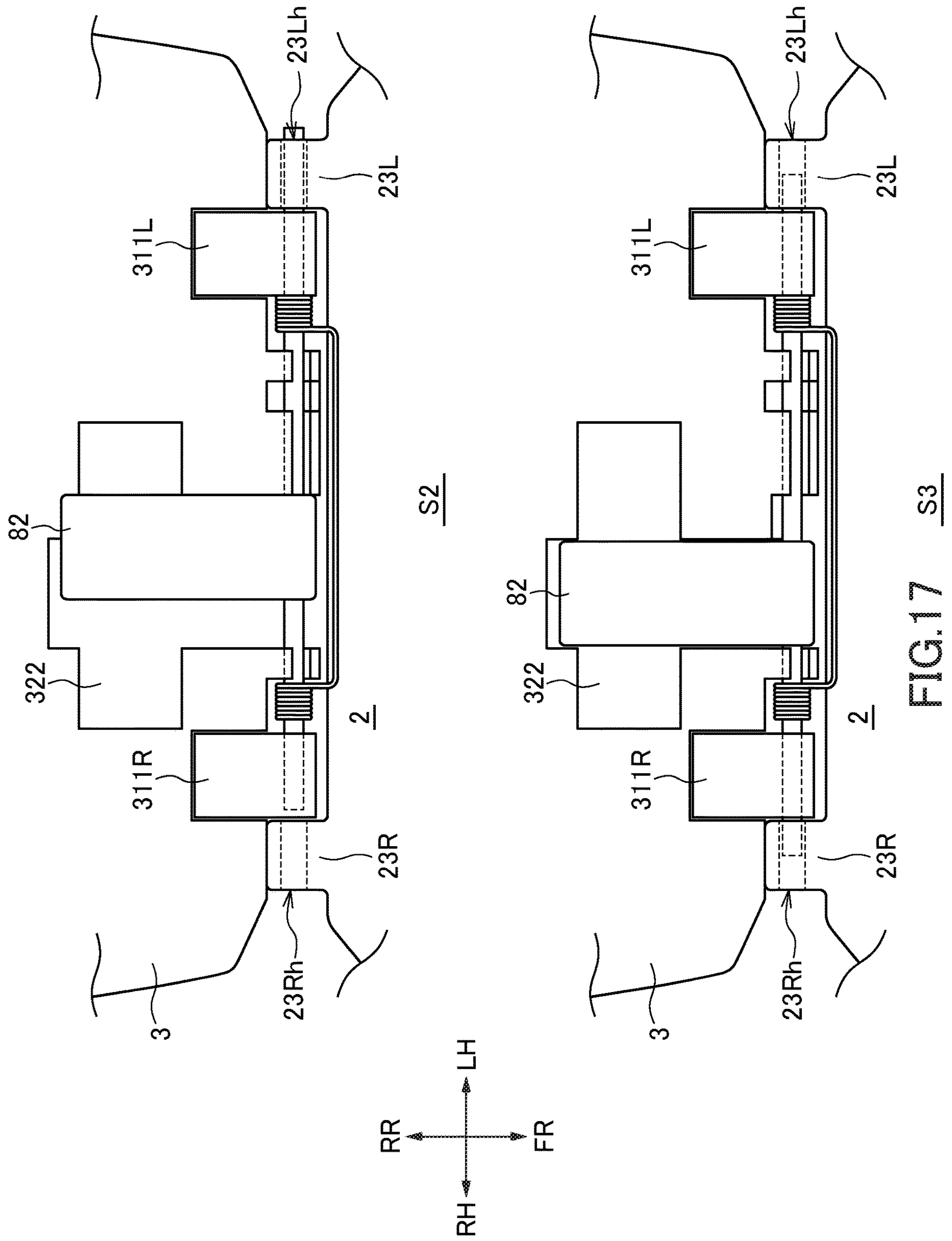
FIG. 17 illustrates the method of mounting the outer printer cover and the inner printer cover by using the hinge.

As described above, the printer cover 3 has a two-layer structure of the outer printer cover 31 and the inner printer cover 32, and the inner printer cover 32 and the hinge shaft 81 are coupled to each other via the operation member 82, as shown by the state S3 in FIG. 17. Thus, when separated from the outer printer cover 31 by unscrewing the screws SC1 and SC2 (refer to FIG. 5), the inner printer cover 32 is swingable around the hinge shaft 81 independently of the outer printer cover 31.

When the outer printer cover 31 is at the open position in the state of being separated from the inner printer cover 32, the integrated platen roller 11 can be temporarily held by the outer printer cover 31.

Temporal Holding of Integrated Platen Roller

Figure 20:
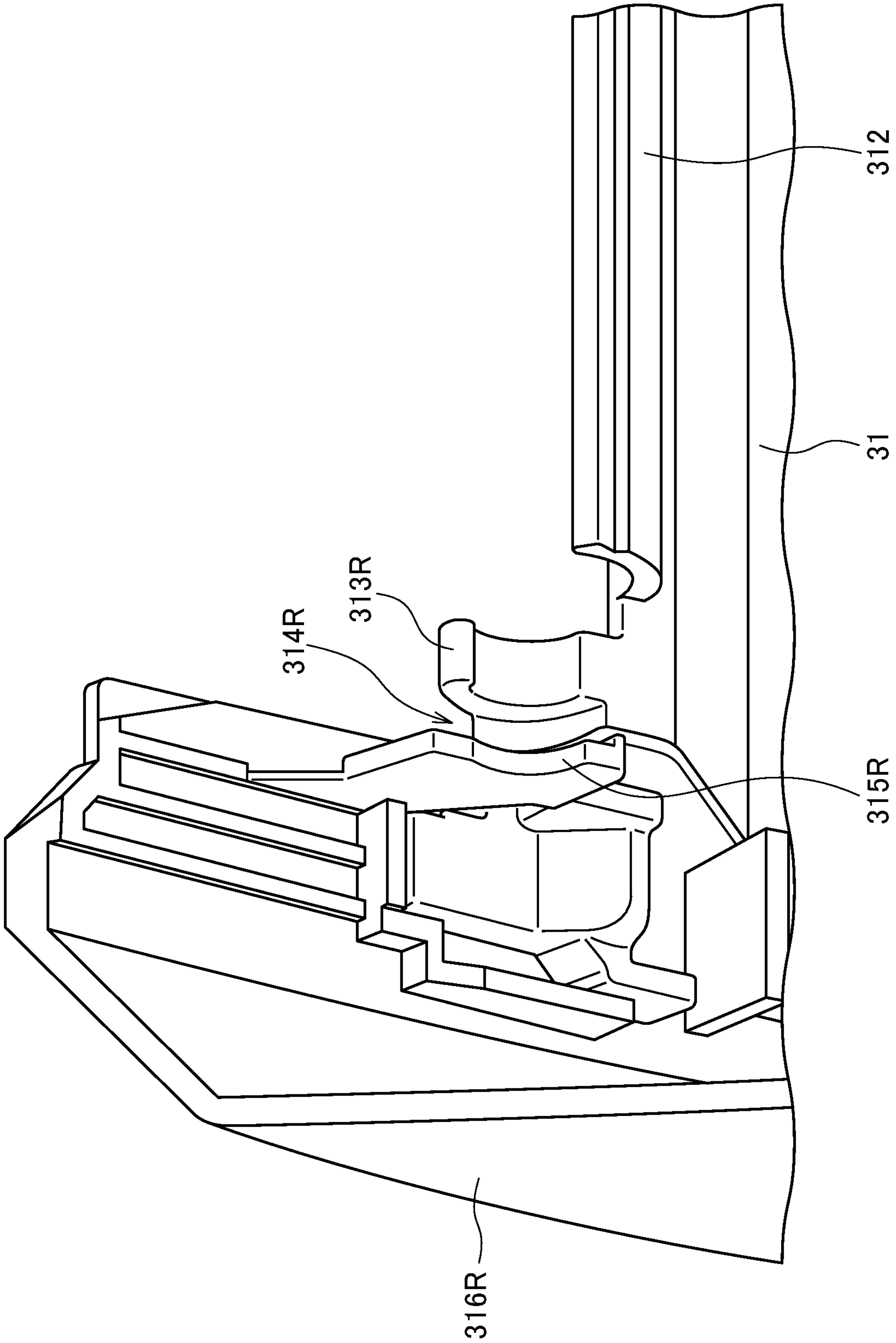
FIG. 20 is a partially enlarged perspective view of the outer printer cover.
Figure 21:
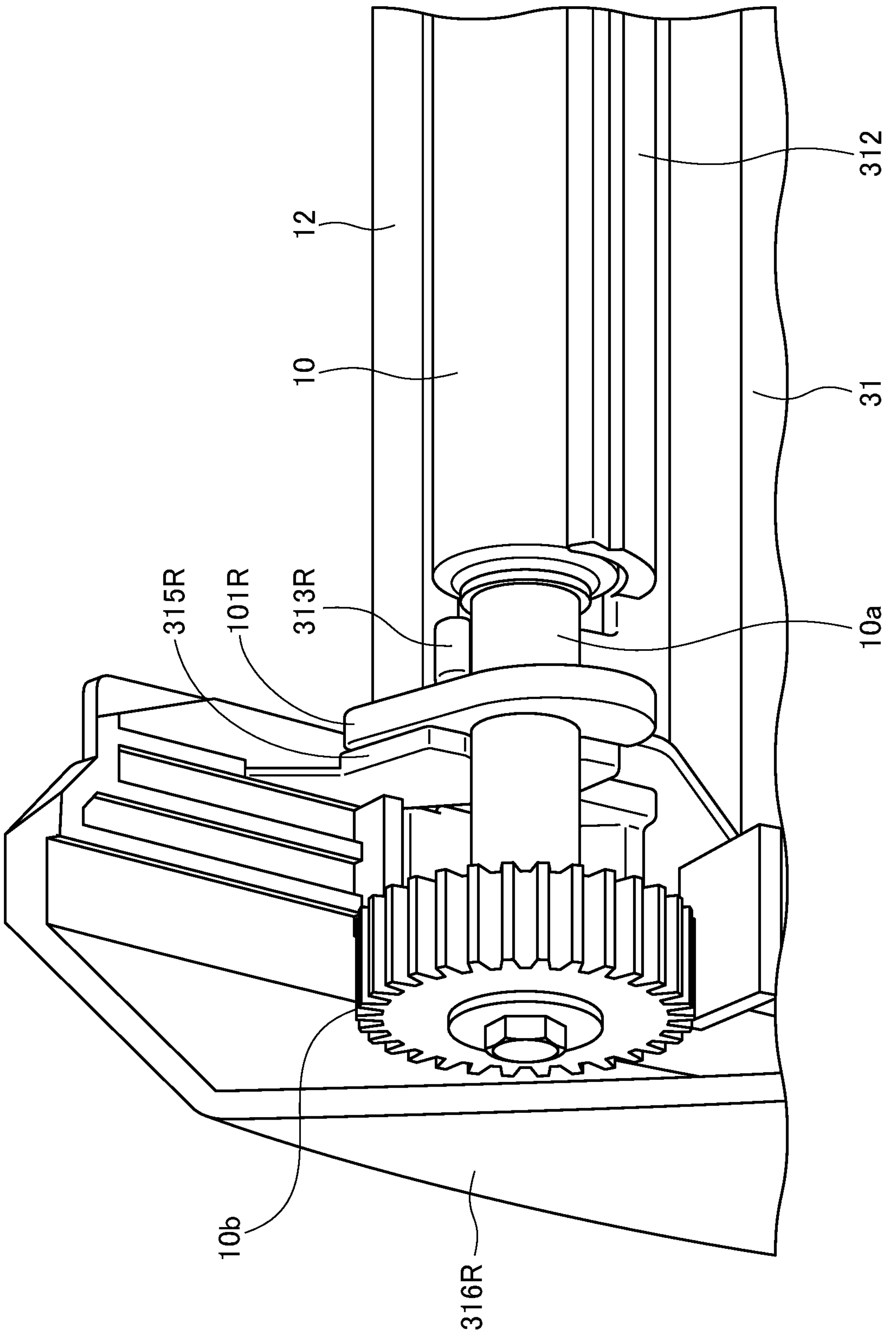
FIG. 21 shows the outer printer cover in FIG. 20, in which the integrated platen roller is temporarily held.
Figure 22:
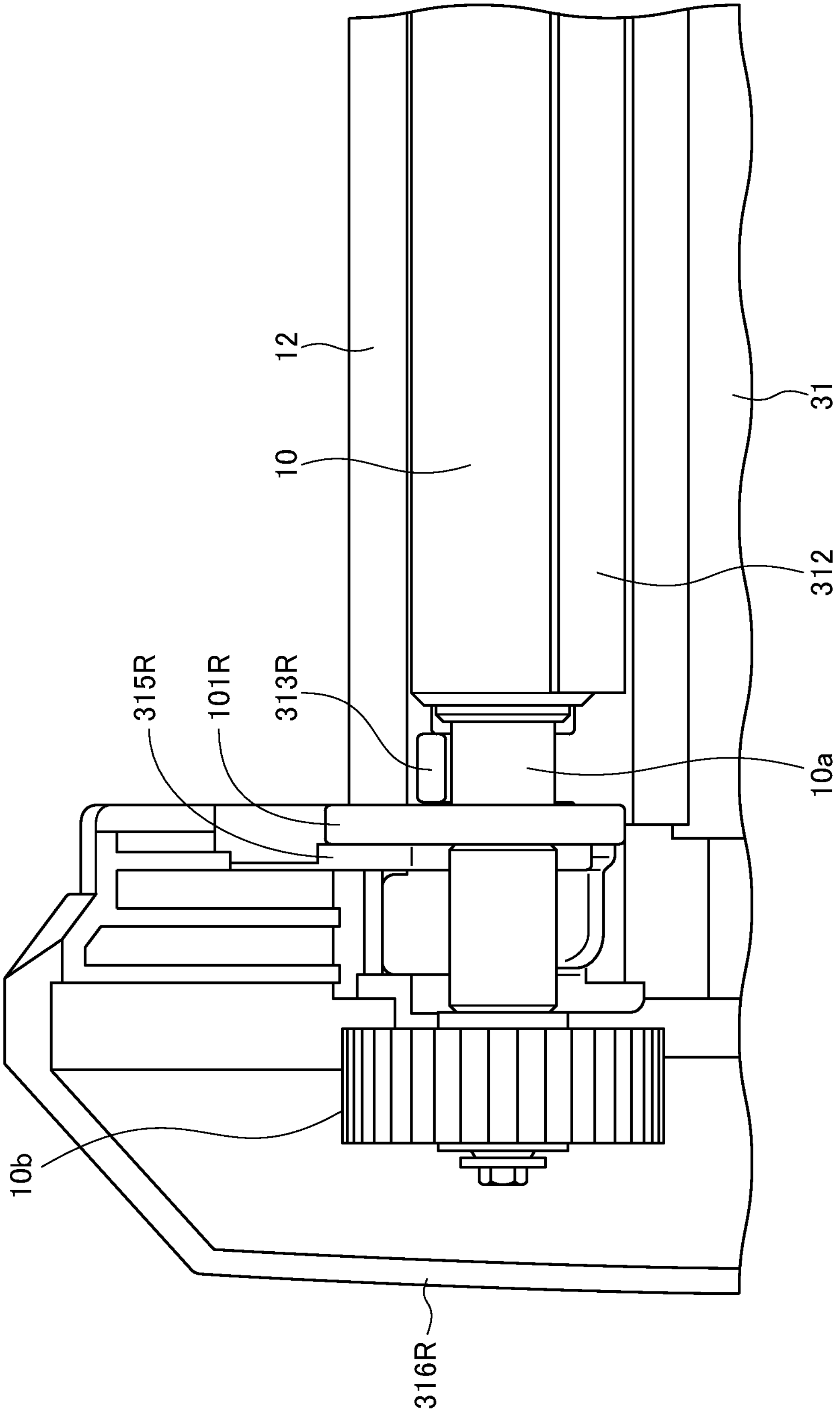
FIG. 22 is a partially enlarged bottom view of the outer printer cover in which the integrated platen roller is temporarily held.

FIGS. 20 to 22 each show an enlarged view of a part surrounding the holding piece 313R of the outer printer cover 31, which is configured to temporarily hold the integrated platen roller 11. FIG. 20 is a perspective view of the outer printer cover 31 in which the integrated platen roller 11 is not temporarily held. FIG. 21 is a perspective view of the outer printer cover 31 in which the integrated platen roller 11 is temporarily held. FIG. 22 is a bottom view of the outer printer cover 31 in which the integrated platen roller 11 is temporarily held.

As shown in FIG. 20 (also refer to FIG. 8), the holding piece 313R for detachably holding the end of the platen shaft 10*a* is provided on a right side of the outer printer cover 31. In an embodiment, the holding piece 313R has a shape with a circular arc cross section, and it effectively holds the platen shaft 10*a*, as shown in FIG. 21.

As shown in FIG. 21, when the integrated platen roller 11 is disposed to the outer printer cover 31, the platen holder 312 temporarily holds the platen roller 10 of the integrated platen roller 11.

As shown in FIG. 20, a projecting piece 315R is provided on an outer side of the holding piece 313R so as to project from an inner surface of the ceiling part 317. The recess 314R is formed between the holding piece 313R and the projecting piece 315R. The recess 314R is interposed between a side surface of the holding piece 313R and a side surface of the projecting piece 315R, and it receives the arm 101R of the integrated platen roller 11, as shown in FIG. 22. For this purpose, the recess 314R has a lateral width that is equal to or slightly greater than the thickness of the arm 101R.

Although the holding piece 313R and the recess 314R are disposed adjacent to each other in the embodiment in FIG. 20, the positions are not limited thereto. The holding piece 313R and the recess 314R can be changed as appropriate, in accordance with the positions of the platen shaft and the arm of the integrated platen roller.

Figure 23:
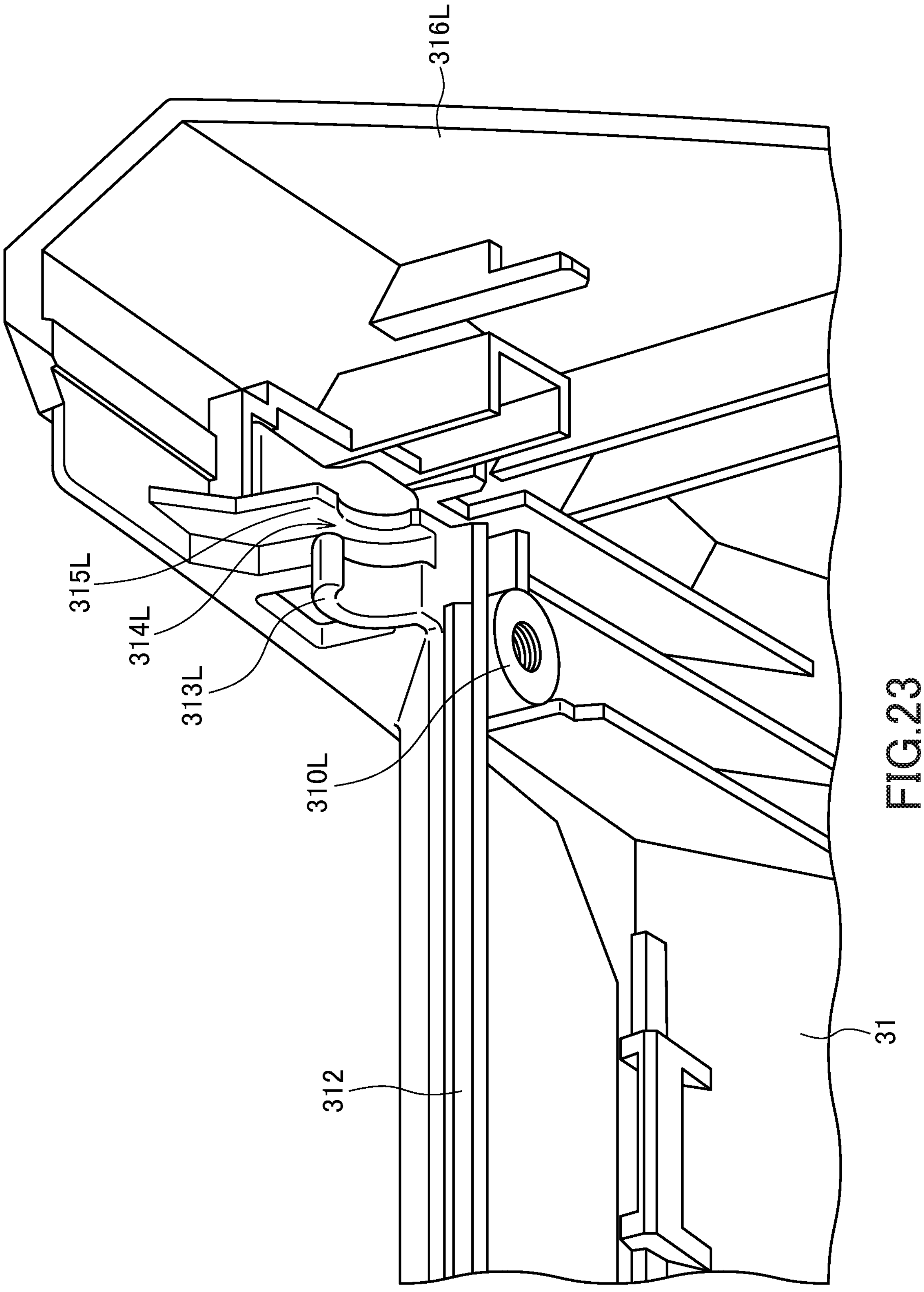
FIG. 23 is a partially enlarged perspective view of the outer printer cover.
Figure 24:
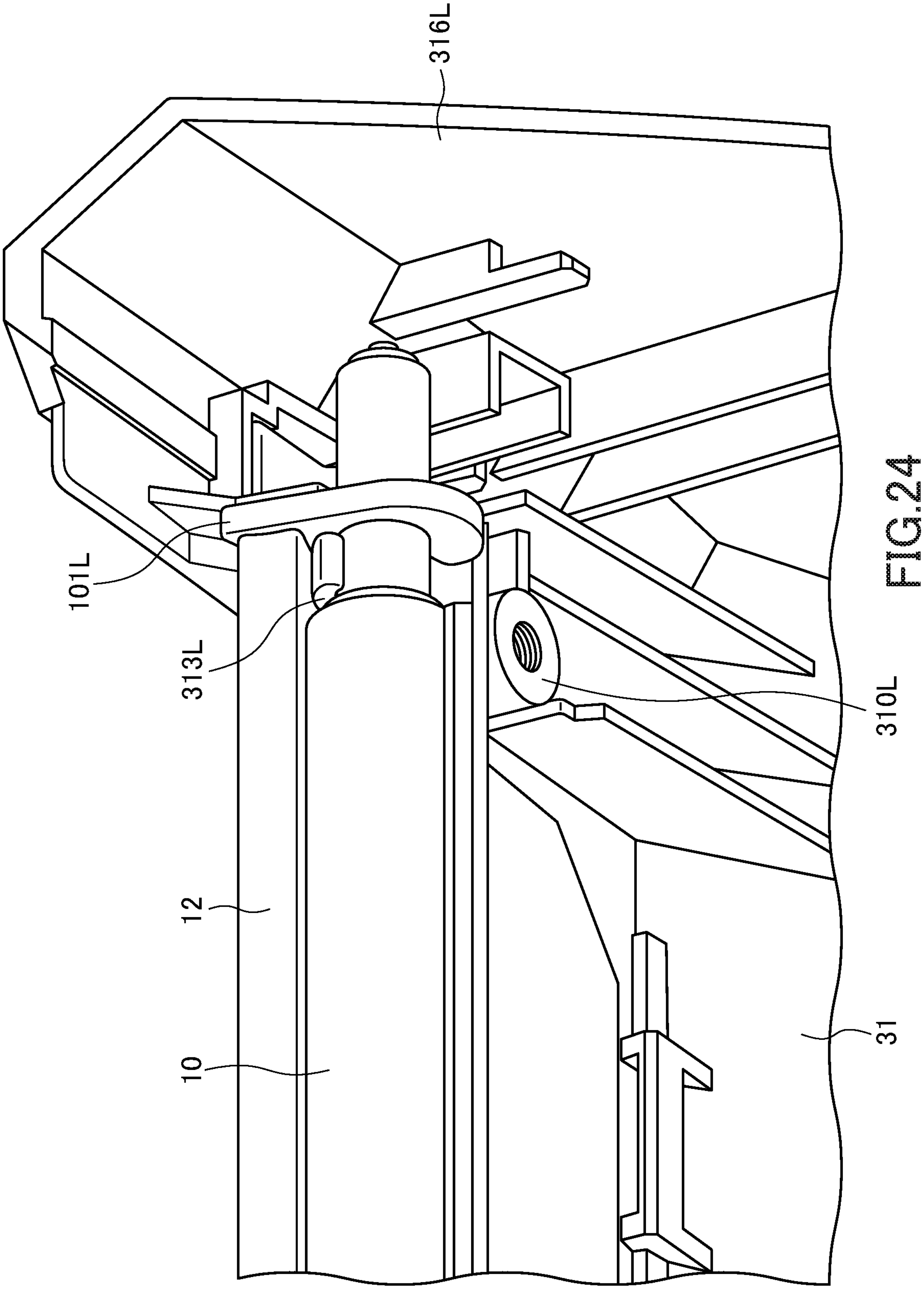
FIG. 24 shows the outer printer cover in FIG. 23, in which the integrated platen roller is temporarily held.

FIGS. 23 and 24 each show an enlarged view of a part surrounding the holding piece 313L of the outer printer cover 31, which is configured to temporarily hold the integrated platen roller 11. FIG. 23 is a perspective view of the outer printer cover 31 in which the integrated platen roller 11 is not temporarily held. FIG. 24 is a perspective view of the outer printer cover 31 in which the integrated platen roller 11 is temporarily held.

As shown in FIG. 23, the holding piece 313L for detachably holding the end of the platen shaft 10*a* is provided also on a left side of the outer printer cover 31. In an embodiment, the holding piece 313L has a shape with a circular arc cross section, and it effectively holds the platen shaft 10*a*, as shown in FIG. 24.

As shown in FIG. 23, a projecting piece 315L is provided on an outer side of the holding piece 313L so as to project from the inner surface from the ceiling part 317. The recess 314L is formed between the holding piece 313L and the projecting piece 315L. The recess 314L is interposed between a side surface of the holding piece 313L and a side surface of the projecting piece 315L, and it receives the arm 101L of the integrated platen roller 11, as shown in FIG. 24. For this purpose, the recess 314L has a lateral width that is equal to or slightly greater than the thickness of the arm 101L.

Although the holding piece 313L and the recess 314L are disposed adjacent to each other in the embodiment in FIG. 23, the positions are not limited thereto. The holding piece 313L and the recess 314L can be changed as appropriate, in accordance with the positions of the platen shaft and the arm of the integrated platen roller.

As described above, the platen shaft 10*a* of the integrated platen roller 11 is held by the paired left and right holding pieces 313L and 313R, and the platen roller 10 of the integrated platen roller 11 is held by the platen holder 312. With this structure, in replacing the integrated platen roller 11, a new integrated platen roller 11 is temporarily held by the outer printer cover 31 that is at the open position, resulting in easy replacement operation.

In addition, the arms 101L and 101R of the integrated platen roller 11 are fitted in the paired left and right recesses 314L and 314R, whereby the temporarily held integrated platen roller 11 does not deviate in the lateral direction.

When the outer printer cover 31 is at the open position when the inner printer cover 32 is detached, the integrated platen roller 11 is reliably temporarily held by the platen holder 312 and the holding pieces 313L and 313R, which are provided on the left and right sides of the outer printer cover 31. In more detail, as it is clear also from FIG. 8, the holding pieces 313L and 313R and the platen holder 312 differ in position in the circumferential direction for holding the integrated platen roller 11. Providing such a platen holder 312 enables temporarily holing the integrated platen roller 11 in a range of wide open angle of the outer printer cover 31.

Figure 25:
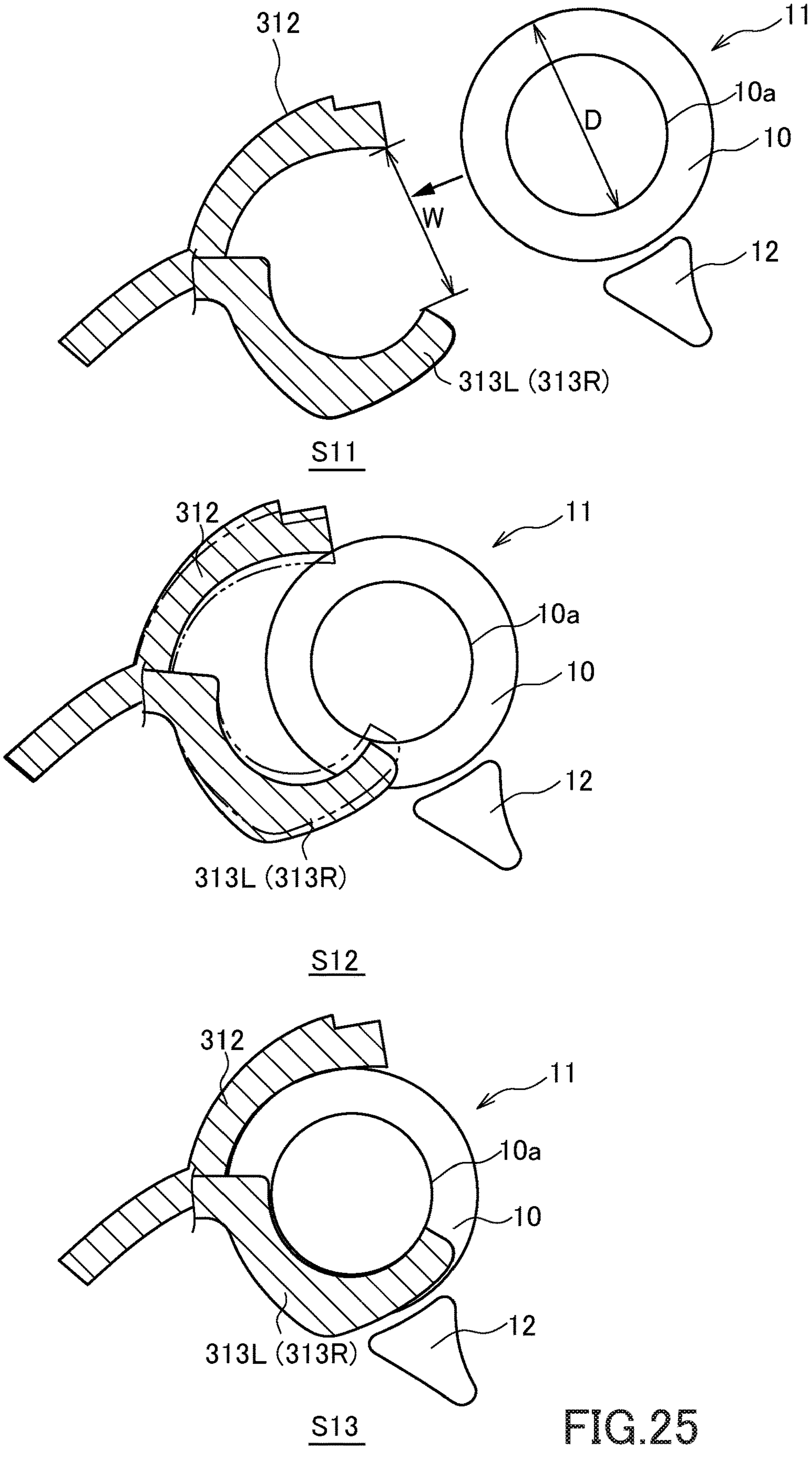
FIG. 25 illustrates movements for making the outer printer cover temporarily hold the integrated platen roller.

FIG. 25 illustrates movements for making the outer printer cover 31 temporarily hold the integrated platen roller 11 when the inner printer cover 32 is detached from the outer printer cover 31. FIG. 25 shows cross sections, which are perpendicular to the axial direction of the platen shaft 10*a*, of the holding pieces 313L and 313R and the platen holder 312 in making the outer printer cover 31 temporarily hold the integrated platen roller 11.

The state S11 in FIG. 25 shows a state before the integrated platen roller 11 is temporarily held. As shown by the state S11, the holding pieces 313L and 313R and the platen holder 312 differ in position in the circumferential direction for holding the integrated platen roller 11. Herein, as seen from a side view, a width "W" of an opening that is formed between the holding piece 313L or 313R and the platen holder 312 is made slightly smaller than a maximum distance "D" between the surface of the platen roller 10 and the surface of the platen shaft 10*a* (namely, $W<D$). With this structure, in response to the integrated platen roller 11 being inserted into the opening, the holding pieces 313L and 313R and the platen holder 312 deform in such a manner as to expand the opening, as shown by the state S12. After the integrated platen roller 11 passes through the opening, the holding pieces 313L and 313R come into contact with the platen shaft 10*a*, and the platen holder 312 abuts on the platen roller 10, as shown by the state S13. That is, the integrated platen roller 11 is inserted into the opening by a certain operating force, and thus, inserting the integrated platen roller 11 provides a feeling of clicking, resulting in good workability in inserting.

Upon being inserted into the opening, the integrated platen roller 11 is pinched by the holding pieces 313L and 313R and the platen holder 312. Thus, the integrated platen roller 11 is firmly held. Moreover, due to the relationship "$W<D$," the integrated platen roller 11 that is once inserted hardly comes off and is reliably held.

In another embodiment, a relationship "W≥D" may be employed. Also in this case, the integrated platen roller 11 is pinched by the holding pieces 313L and 313R and the platen holder 312, whereby a certain degree of holding force is obtained.

Although the platen holder 312 is provided over the whole area between the holding pieces 313L and 313R in the embodiment in FIG. 8, the length of the platen holder 312 is not limited thereto. For example, even when provided only at a center part separated in the lateral direction from the holding pieces 313L and 313R, the platen holder can sufficiently hold the platen roller 10.

Although the platen holder 312 has a circular arc cross section and thereby effectively holds the platen roller 10 in the embodiment in FIG. 8, the shape of the platen holder 312 is not limited thereto. For example, the platen holder 312 may have a polygonal cross section that enables temporarily holding the platen roller 10.

As described above, in the printer 1, when separated from the outer printer cover 31, the inner printer cover 32 is swingable around the hinge shaft 81 independently of the outer printer cover 31. In this state, when the outer printer cover 31 is at the open position, the holding pieces 313L and 313R of the outer printer cover 31 are able to temporarily hold the integrated platen roller 11. This enables easily replacing the integrated platen roller 11, which is a consumable item.

Complete Holding of Integrated Platen Roller

The integrated platen roller 11 is temporarily held by the outer printer cover 31, as described above, and it can be completely held by the printer cover 3 by attaching the inner printer cover 32 to the outer printer cover 31. This holding structure will be described with reference to FIGS. 26 to 28.

Figure 26:
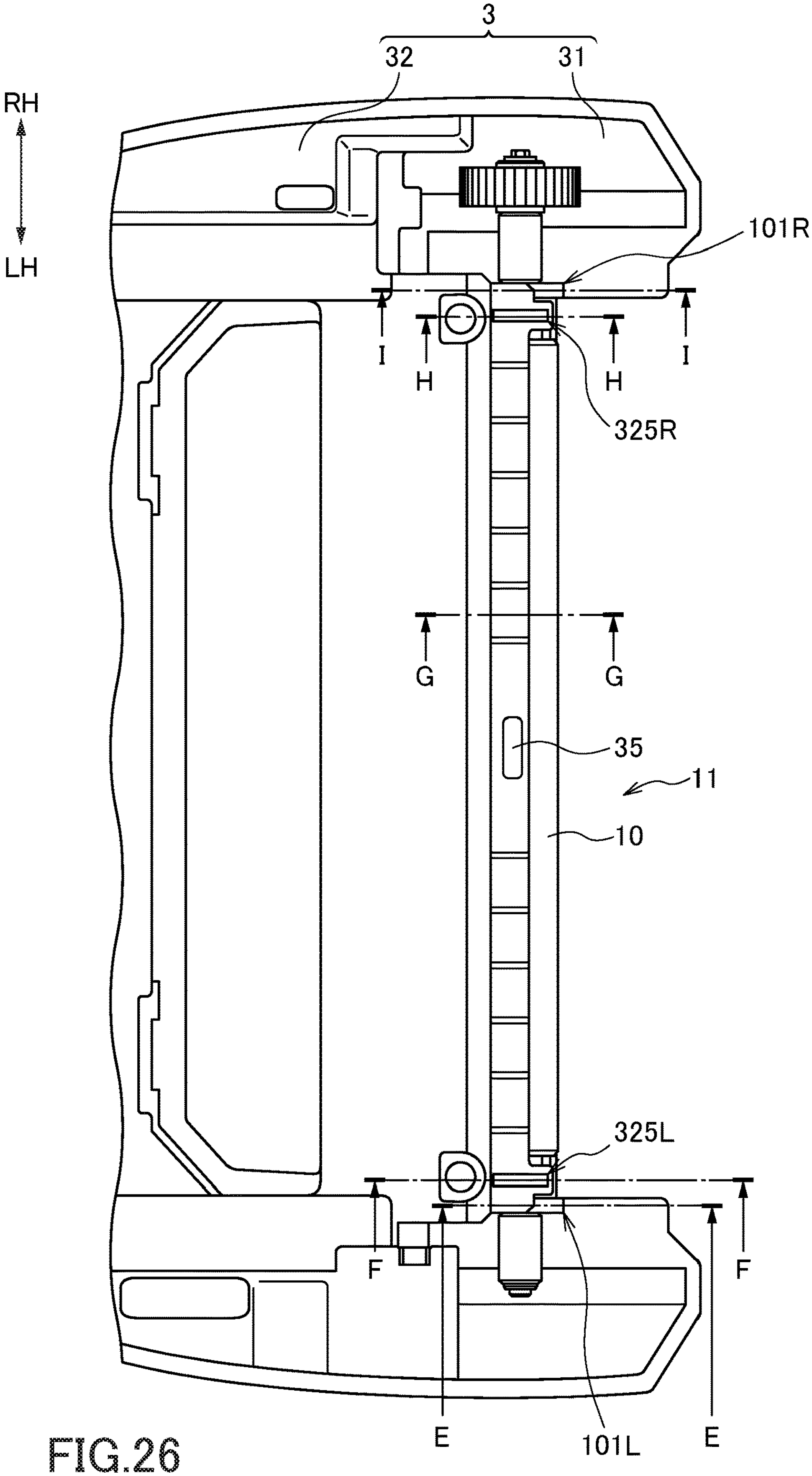
FIG. 26 is a bottom view of the printer cover of the embodiment.

FIG. 26 is a bottom view of the printer cover 3 of the one embodiment. FIG. 27 shows an enlarged E-E cross section, an enlarged F-F cross section, and an enlarged G-G cross section in FIG. 26. FIG. 28 shows an enlarged H-H cross section and an enlarged I-I cross section in FIG. 26.

When the integrated platen roller 11 is disposed to the outer printer cover 31, the platen shaft 10*a* of the integrated platen roller 11 is temporarily held by the paired left and right holding pieces 313L and 313R of the outer printer cover 31. In this state, when the inner printer cover 32 is attached to the outer printer cover 31, the cover parts 325L and 325R of the inner printer cover 32 are respectively disposed to face the holding pieces 313L and 313R of the outer printer cover 31 and cover at least a part of exposed parts of the platen shaft 10*a* that is temporarily held, as shown by the enlarged F-F cross section in FIG. 27 and the enlarged H-H cross section in FIG. 28. Thus, both ends of the platen shaft 10*a* are reliably held by the printer cover 3.

When the integrated platen roller 11 is disposed to the outer printer cover 31, the arms 101L and 101R of the integrated platen roller 11 are fitted in the paired left and right recesses 314L and 314R of the outer printer cover 31. In this state, when the inner printer cover 32 is attached to the outer printer cover 31, the arms 101L and 101R abut on an abutting surface 328 of the inner printer cover 32, as shown by the enlarged E-E cross section in FIG. 27 and the enlarged I-I cross section in FIG. 28. In addition, the protrusions 102L and 103L (refer to FIG. 7) of the arm 101L and the protrusions 102R and 103R (refer to FIG. 7) of the arm 101R abut on the outer printer cover 31, whereby radial movement of the integrated platen roller 11 is restricted. Thus, the arms 101L and 101R of the integrated platen roller 11 are reliably held by the printer cover 3.

However, the abutting surface 328 is not necessarily provided to the inner printer cover 32. Even when the inner printer cover 32 does not abut on the arms 101L and 101R, lateral deviation of the integrated platen roller 11 does not occur in the condition in which both ends of the platen shaft 10*a* are held and the arms 101L and 101R are fitted in the recesses 314L and 314R of the outer printer cover 31.

As shown by the enlarged G-G cross section in FIG. 27, when the inner printer cover 32 is attached to the outer printer cover 31, the platen holder 312 is not in contact with the outer circumferential surface of the platen roller 10 and does not interfere with smooth rotation of the platen roller 10.

Replacement Procedure of Integrated Platen Roller 11

Next, a replacement procedure of the integrated platen roller 11 will be described.

In order to replace the integrated platen roller 11, the printer cover 3 is moved to the open position, and the inner printer cover 32 is then separated from the outer printer cover 31 by unscrewing the screws SC1 and SC2 (refer to FIG. 5). The inner printer cover 32 is swingable independently of the outer printer cover 31, and therefore, only the inner printer cover 32 is moved to the closed position.

The inner printer cover 32 that is at the closed position can cover the paper roll "R," which is contained in the paper roll-containing chamber 9 (an example of a containing part for containing a roll body). Thus, the paper roll "R," which is contained in the paper roll-containing chamber 9, is protected in replacing the integrated platen roller 11.

In addition, as shown in FIG. 16, the holding piece 319 of the outer printer cover 31 is interposed between the grasping parts 326*a* and 326*b* of the inner printer cover 32. This structure restricts lateral movement of the inner printer cover 32 when the inner printer cover 32 is swung independently of the outer printer cover 31. As a result, the inner printer cover 32 swings smoothly.

Then, the current integrated platen roller 11 is taken out of the outer printer cover 31 that is at the open position, and a new integrated platen roller 11 is set to the outer printer cover 31. Specifically, the arms 101L and 101R of the new integrated platen roller 11 are inserted into the recesses 314L and 314R, and the platen shaft 10*a* is disposed on the holding pieces 313L and 313R. At this time, as described above, the outer printer cover 31 temporarily holds the new integrated platen roller 11.

Thereafter, the inner printer cover 32 is swung from the closed position to the open position and is coupled to the outer printer cover 31 by fastening the screws SC1 and SC2. In this state, both ends of the platen shaft 10*a* are reliably held by the printer cover 3.

Although some embodiments of the printer of the present invention are described above, the present invention should not be limited to the foregoing embodiments. In addition, the embodiments described above can be variously modified and altered within the scope not departing from the gist of the present invention. For example, respective technical features described in the foregoing embodiments can be combined with one another as appropriate, unless technical contradiction occurs.

Although the above-described embodiment of the printer 1 includes the integrated platen roller 11 having a combination of the platen roller 10 and the peeling bar 12, the structure is not limited thereto. In a printer of another embodiment, peeling issuing may not be performed, and therefore, the peeling bar 12 may not be provided. In this printer of the another embodiment, a protrusion similar to the arm 101L or 101R is provided to at least one of the platen shaft of the platen roller. Due to no need of the peeling bar, paired protrusions are not necessary, and one protrusion may be provided. In this printer of the another embodiment, the protrusion that is provided to the platen shaft is received by the recess of the outer printer cover, which prevents lateral positional deviation of the platen roller.

A case in which some parts (e.g., shafts and ends of springs) of components inside the printer 1 are coupled to the internal frame is described here; but the structure is not limited thereto, and these parts may be coupled to the body case 2.

Although a case of using a print medium that is a continuous paper having a plurality of labels temporarily attached on a liner is described in the foregoing embodiments, the print medium is not limited thereto. For continuous issuing or for a printer not provided with a peeling unit, for example, a continuous label having an adhesive surface on one side (label without a liner), a continuous sheet without an adhesive surface (continuous sheet), or a material other than papers such as a film, which is printable by a thermal head, may also be used as a print medium. In addition, in a case of feeding a label having an exposed adhesive due to no liner, a feeding path may be coated with a non-adhesive material, and a non-adhesive roller containing silicone or the like may be provided as a platen roller.

The present invention is related to Japanese Patent Application No. 2020-191930 filed with the Japan Patent Office on Nov. 18, 2020, the entire contents of which are incorporated into this specification by reference.

The invention claimed is:

1. A printer comprising:

a body case;

a platen roller configured to feed a print medium, the platen roller comprising:

a central portion, and a pair of shaft portions extending outward from opposite sides of the central portion, wherein a diameter of each of the shaft portions is less than a diameter of the central portion; and a printer cover being swingable relative to the body case and having an outer printer cover and an inner printer cover that are disposed to overlap each other, wherein the inner printer cover is detachably attached to the outer printer cover, the inner printer cover being swingable relative to the body case, independently of the outer printer cover, when the inner printer cover is detached from the outer printer cover, and the outer printer cover comprises:

a pair of first holders, each configured to abut on and detachably hold a respective one of the shaft portions of the platen roller when the inner printer cover is detached from the outer printer cover, and a second holder configured to abut on and detachably hold the central portion of the platen roller when the inner printer cover is detached from the outer printer cover.

2. The printer according to claim 1, wherein the inner printer cover has a cover part that faces the pair of first holders of the outer printer cover so as to cover at least a portion of an exposed part of the shaft portions held by the pair of first holders.

3. The printer according to claim 2, wherein each of the pair of first holders and the second holder has a shape with a circular arc cross-sectional shape.

4. The printer according to claim 2, wherein:

the platen roller comprises a protrusion that protrudes in a normal line direction from the surface of one of the shaft portions of the platen roller, and the outer printer cover has a recess that receives the protrusion when the platen shaft is held by the pair of first holders.

5. The printer according to claim 1, wherein each of the pair of first holders and the second holder has a shape with a circular arc cross-sectional shape.

6. The printer according to claim 5, wherein:

the platen roller comprises a protrusion that protrudes in a normal line direction from the surface of one of the shaft portions of the platen roller, and the outer printer cover has a recess that receives the protrusion when the platen shaft is held by the pair of first holders.

7. The printer according to claim 5, wherein an axis of the circular arc cross-sectional shape of the pair of first holders is offset from an axis of the circular arc cross-sectional shape of the second holder.

8. The printer according to claim 1, wherein, as seen from a side view, a widths of openings that are formed between the pair of first holders and the second holder are smaller than a maximum distance between a surface of the central portion of the platen roller and a surface of the shaft portions of the platen roller.

9. The printer according to claim 8, wherein:

the platen roller comprises a protrusion that protrudes in a normal line direction from the surface of one of the shaft portions of the platen roller, and the outer printer cover has a recess that receives the protrusion when the platen shaft is held by the pair of first holders.

10. The printer according to claim 1, wherein:

the platen roller comprises a protrusion that protrudes in a normal line direction from the surface of one of the shaft portions of the platen roller, and the outer printer cover has a recess that receives the protrusion when the platen shaft is held by the pair of first holders.

11. The printer according to claim 10, wherein;

the platen roller comprises a pair of protrusions, each protruding in a normal line direction from a surface of a respective one of the shaft portions of the platen roller, and the outer printer cover has a pair of recesses, each receiving a respective one of the protrusions when the platen shaft is held by the first pair of first holders.

12. The printer according to claim 11, wherein:

the print medium includes a liner and labels that are releasably attached on the liner, the printer is configured to allow switching between peeling issuing for issuing the labels after peeling them from the liner of the print medium, and continuous issuing for issuing the labels without peeling them from the liner, the printer further comprises a peeling member that extends in parallel to the platen roller and that is configured to peel the labels from the liner, the peeling member is disposed at a position in contact with the liner, on a downstream side of the platen roller, in peeling issuing, and each side of the peeling member is coupled to a respective one of the protrusions.

13. The printer according to claim 1, wherein:

a gear is coupled to an end of the platen shaft, and the inner printer cover is configured such that:

when the platen roller is installed in a correct orientation on the outer printer cover, in which the platen shaft is held by the pair of first holders so that the gear is disposed on a first side in an axial direction of the platen shaft, the gear does not come into contact with the inner printer cover upon assembly of the inner printer cover to the outer printer cover, and when the platen roller is installed in an incorrect orientation on the outer printer cover, in which the platen shaft is held by the pair of first holders so that the gear is disposed on a second side in the axial direction of the platen shaft, the gear comes into contact with the inner printer cover upon assembly of the inner printer cover to the outer printer cover and thereby inhibits assembly of the inner printer cover to the outer printer cover.

14. The printer according to claim 1, wherein:

the body case defines a containing chamber for containing a roll body into which the print medium that is wound, and the inner printer cover is configured to swing to a closed position to be closed and thereby cover the roll body that is contained in the containing chamber, when the inner printer cover in an open position relative to the body case is detached from the outer printer cover.

15. The printer according to claim 14, wherein each of the outer printer cover and the inner printer cover has a side wall that forms a side surface of the containing chamber.

16. The printer according to claim 1, wherein the inner printer cover has a first surface that faces a feeding path in which the print medium is fed to the platen roller, and the first surface is formed with a ridge part.

17. The printer according to claim 1, wherein:

each of the pair of first holders and the second holder has concave cross-sectional shape, and an axis of the concave cross-sectional shape of the pair of first holders is offset from an axis of the concave cross-sectional shape of the second holder.

18. The printer according to claim 1, wherein:

when the inner printer cover is attached to the outer printer cover, the second holder is separated from the central portion of the platen roller.

19. A printer comprising:

a body case;

a platen roller configured to feed a print medium; and a printer cover being swingable relative to the body case and having an outer printer cover and an inner printer cover that are disposed to overlap each other, wherein:

the inner printer cover is detachably attached to the outer printer cover, the inner printer cover being swingable relative to the body case, independently of the outer printer cover, when the inner printer cover is detached from the outer printer cover, the outer printer cover comprises:

a first holder configured to detachably hold both ends of a platen shaft of the platen roller when the inner printer cover is detached from the outer printer cover, and a second holder configured to detachably hold the platen roller when the inner printer cover is detached from the outer printer cover, and the inner printer cover has a cover part that faces the first holder of the outer printer cover so as to cover at least a portion of an exposed part of the platen shaft held by the first holder.

20. A printer comprising:

a body case;

a platen roller configured to feed a print medium; and a printer cover being swingable relative to the body case and having an outer printer cover and an inner printer cover that are disposed to overlap each other, wherein:

the inner printer cover is detachably attached to the outer printer cover, the inner printer cover being swingable relative to the body case, independently of the outer printer cover, when the inner printer cover is detached from the outer printer cover, the outer printer cover comprises:

a first holder configured to detachably hold both ends of a platen shaft of the platen roller when the inner printer cover is detached from the outer printer cover, and a second holder configured to detachably hold the platen roller when the inner printer cover is detached from the outer printer cover, the body case defines a containing chamber for containing a roll body into which the print medium that is wound, and the inner printer cover is configured to swing to a closed position to be closed and thereby cover the roll body that is contained in the containing chamber, when the inner printer cover in an open position relative to the body case is detached from the outer printer cover, and each of the outer printer cover and the inner printer cover has a side wall that forms a side surface of the containing chamber.

* * * * *